United States Patent
Samuelsson et al.

(10) Patent No.: US 9,247,262 B2
(45) Date of Patent: Jan. 26, 2016

(54) ABSOLUTE OR EXPLICIT REFERENCE PICTURE SIGNALING

(75) Inventors: Jonatan Samuelsson, Stockholm (SE); Rickard Sjöberg, Stockholm (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 211 days.

(21) Appl. No.: 14/127,545

(22) PCT Filed: Apr. 27, 2012

(86) PCT No.: PCT/SE2012/050444
§ 371 (c)(1),
(2), (4) Date: Dec. 19, 2013

(87) PCT Pub. No.: WO2013/002701
PCT Pub. Date: Jan. 3, 2013

(65) Prior Publication Data
US 2014/0126640 A1  May 8, 2014

Related U.S. Application Data

(60) Provisional application No. 61/509,690, filed on Jul. 20, 2011.

(51) Int. Cl.
*H04N 19/433* (2014.01)
*H04N 19/51* (2014.01)
(Continued)

(52) U.S. Cl.
CPC ....... *H04N 19/433* (2014.11); *H04N 19/00515* (2013.01); *H04N 19/46* (2014.11);
(Continued)

(58) Field of Classification Search
CPC . H04N 19/00515; H04N 19/70; H04N 19/46; H04N 19/58; H04N 19/89; H04N 19/433; H04N 19/573; H04N 19/61

USPC ............ 375/240.01, 240.15, 240.16, 240.25, 375/240.27
See application file for complete search history.

(56) References Cited

U.S. PATENT DOCUMENTS 8,532,180 B2   9/2013  Koo et al.
9,008,181 B2*  4/2015  Chen .................... H04N 19/159
                                                 375/240.15
(Continued)

FOREIGN PATENT DOCUMENTS

WO      2008105389 A1    9/2008

OTHER PUBLICATIONS

Borgwardt, P., "Multi-picture Buffer Semantics for Interlaced Coding", Joint Video Team (JVT) of ISO/IEC MPEG & ITU-T VCEG (ISO/IEC JTC1/SC29/WG11 and ITU-T SG16 Q.6), 3rd Meeting: Fairfax, VA, May 6, 2002, pp. 1-18, Document JVT-O049, Filename: JVT-O049.doc, XP30005158A.

(Continued)

*Primary Examiner* — Christopher S Kelley
*Assistant Examiner* — Zhihan Zhou
(74) *Attorney, Agent, or Firm* — Coats & Bennett, PLLC

(57) ABSTRACT

An encoded representation (60) of a picture (10) of a video stream (1) is decoded by retrieving buffer description information identifying a buffer description defining multiple reference pictures (40, 42) of the video stream (1) from the encoded representation (60). A picture identifier of a reference picture (42) is determined based on picture identifier information retrieved from the buffer description for the reference picture (42) and a reference picture preceding the reference picture according to a list order in the buffer description. The determined picture identifier is used to update a decoded picture buffer (230, 350) that stores reference pictures (40, 42) to be used as decoding reference for the picture (10) and/or any subsequent picture (50) of the video stream (1).

10 Claims, 13 Drawing Sheets

(51) Int. Cl.
*H04N 19/70* (2014.01)
*H04N 19/46* (2014.01)
*H04N 19/61* (2014.01)
*H04N 19/89* (2014.01)
*H04N 19/573* (2014.01)
*H04N 19/58* (2014.01)

(52) U.S. Cl.
CPC ............ *H04N 19/573* (2014.11); *H04N 19/58* (2014.11); *H04N 19/61* (2014.11); *H04N 19/70* (2014.11); *H04N 19/89* (2014.11)

(56) References Cited

U.S. PATENT DOCUMENTS

| | | | |
|---|---|---|---|
| 2005/0207490 A1 | 9/2005 | Wang et al. | |
| 2009/0238261 A1* | 9/2009 | Bhavani | H04N 19/573 375/240.01 |
| 2010/0118944 A1 | 5/2010 | Tanaka et al. | |
| 2010/0208828 A1 | 8/2010 | Lu et al. | |
| 2010/0260269 A1* | 10/2010 | He | H04N 19/159 375/240.27 |

OTHER PUBLICATIONS

Shen, Q., et al., "Buffer Requirement Analysis and Reference Picture Marking for Temporal Scalable Video Coding", Packet Video 2007, Nov. 12, 2007, pp. 91-97, IEEE, XP 31170603A.

Sjoberg, R., et al., "Absolute signaling of reference picture", Joint Collaborative Team on Video Coding (JCT-VC) of ITU-T SG16 WP3 and ISO/IEC JTC1/SC29/WG11, 6th Meeting: Torino, 2011, Jul. 1, 2011, pp. 1-10, Document: JCTVC-F493, Version 1, WG11 No. m20923, XP 30009516A.

ISO/IEC, "Information technology—Coding of audio-visual objects—Part 10: Advanced Video Coding", International Standard, Oct. 1, 2004, pp. 1-280, second edition, ISO/IEC 14496-10:2004(E), International Organization for Standardization.

Sjöberg, R., et al., "Absolute signaling of reference pictures", Joint Collaborative Team on Video Coding (JCT-VC) of ITU-T SG16 WP3 and ISO/IEC JTC1/SC29/WG11, 6th Meeting: Torino, 2011, Jul. 19, 2011, pp. 1-15, Document: JCTVC-F493, Version 6, WG11 No. m20923.

Sjöberg, R., et al., "Attachment to JCTVC-F493 (Absolute signalling of reference pictures); Proposed changes to the HEVC Working Draft, Proposed changes in section 7.3 Syntax", Jul. 19, 2011, pp. 1-23.

JCT-VC Committee, "JCT-VC Document Management System, Preview document JCTVC-F493 for Torino meeting (MPEG No. m20923)", Jul. 19, 2011, pp. 1-2.

* cited by examiner

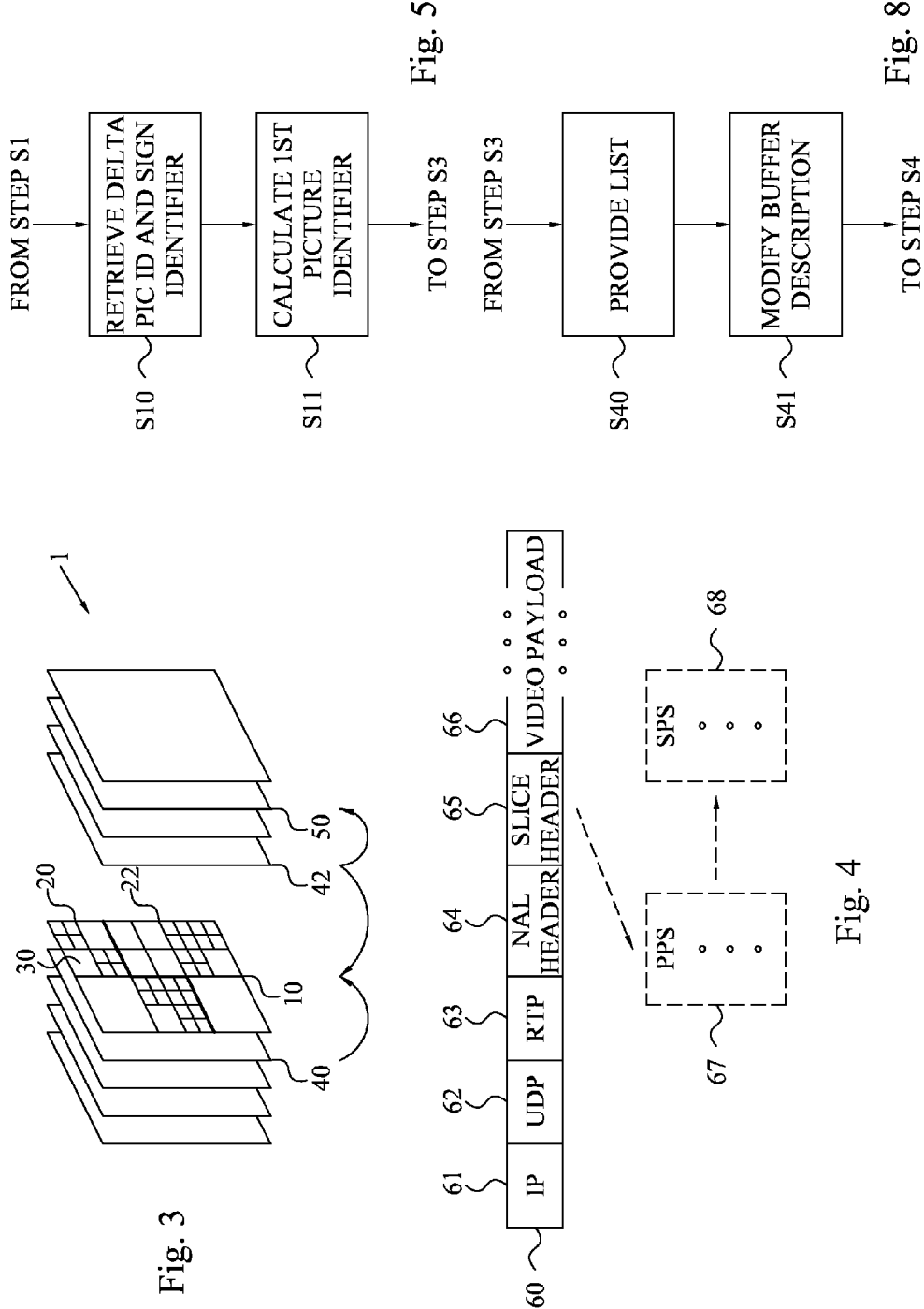

ABSOLUTE OR EXPLICIT REFERENCE PICTURE SIGNALING

TECHNICAL FIELD

The embodiments generally relate to reference picture management in connection with video encoding and decoding, and in particular to reference picture signaling and buffer management.

BACKGROUND

H.264, also referred to as Moving Picture Experts Group-4 (MPEG-4) Advanced Video Coding (AVC), is the state of the art video coding standard. It consists of a block based hybrid video coding scheme that exploits temporal and spatial prediction.

High Efficiency Video Coding (HEVC) is a new video coding standard currently being developed in Joint Collaborative Team—Video Coding (JCT-VC). JCT-VC is a collaborative project between MPEG and International Telecommunication Union Telecommunication standardization sector (ITU-T). Currently, a Working Draft (WD) is defined that includes large macroblocks (abbreviated LCUs for Largest Coding Units) and a number of other new tools and is considerably more efficient than H.264/AVC.

At a receiver a decoder receives a bit stream representing pictures, i.e. video data packets of compressed data. The compressed data comprises payload and control information. The control information comprises e.g. information of which reference pictures should be stored in a decoded picture buffer (DPB), also referred to as a reference picture buffer. This information is a relative reference to previous received pictures. Further, the decoder decodes the received bit stream and displays the decoded picture. In addition, the decoded pictures are stored in the decoded picture buffer according to the control information. These stored reference pictures are used by the decoder when decoding subsequent pictures.

A working assumption for the processes of decoded picture buffer operations in the working draft of HEVC is that they will be inherited from H.264/AVC to a very large extent. A simplified flow chart of the scheme as it is designed in H.264/AVC is shown in FIG. 1.

Before the actual decoding of a picture, the frame_num in the slice header is parsed to detect a possible gap in frame_num if Sequence Parameter Set (SPS) syntax element gaps_in_frame_num_value_allowed_flag is 1. The frame_num indicates the decoding order. If a gap in frame_num is detected, "non-existing" frames are created and inserted into the decoded picture buffer.

Regardless of whether there was a gap in frame_num or not the next step is the actual decoding of the current picture. If the slice headers of the picture contain Memory Management Control Operations (MMCO) commands, adaptive memory control process is applied after decoding of the picture to obtain relative reference to the pictures to be stored in the decoded picture buffer; otherwise a sliding window process is applied to obtain relative reference to the pictures to be stored in the decoded picture buffer. As a final step, the "bumping" process is applied to deliver the pictures in correct order.

A problem with H.264/AVC is its vulnerability to losses of pictures that contains MMCO of type 2, 3, 4, 5 or 6 as described in Table 1 below.

TABLE 1

| Memory management control operation values for H.264/AVC | |
|---|---|
| memory_management_control_operation | Memory Management Control Operation |
| 0 | End memory_management_control_operation syntax element loop |
| 1 | Mark a short-term reference picture as "unused for reference" |
| 2 | Mark a long-term reference picture as "unused for reference" |
| 3 | Mark a short-term reference picture as "used for long-term reference" and assign a long-term frame index to it |
| 4 | Specify the maximum long-term frame index and mark all long-term reference pictures having long-term frame indices greater than the maximum value as "unused for reference" |
| 5 | Mark all reference pictures as "unused for reference" and set the MaxLongTermFrameIdx variable to "no long-term frame indices" |
| 6 | Mark the current picture as "used for long-term reference" and assign a long-term frame index to it |

Loss of a picture that does not contain MMCO, or a picture that contains MMCO of type 0 or 1, is of course severe to the decoding process. Pixel values of the lost picture will not be available and may affect future pictures for a long period of time due to incorrect inter prediction. There is also a risk that reference picture lists for a few pictures following the lost picture will be wrong, for example if the lost picture contained MMCO that marked one short-term reference picture as "unused for reference" that otherwise would have been included in the reference picture list of the following picture. However, the decoding process can generally recover such a loss through usage of constrained intra blocks, intra slices or by other means.

But if a picture containing MMCO of type 2, 3, 4, 5 or 6 is lost there is a risk that the number of long term pictures in the DPB is different from what it would have been if the picture was received, resulting in an "incorrect" sliding window process for all the following pictures. That is, the encoder and decoder will contain a different number of short-term pictures resulting in out-of-sync behavior of the sliding window process. This loss cannot be recovered through usage of constrained intra blocks, intra slices or similar techniques (not even an open Group Of Picture (GOP) Intra picture). The only way to ensure recovery from such a loss is through an Instantaneous Decoder Refresh (IDR) picture or through an MMCO that cancels the effect of the lost MMCO. What makes the situation even worse is that a decoder will not necessarily know that the sliding window process is out-of-sync and thus cannot report the problem to the encoder or request an IDR picture even in applications where a feedback channel is available.

One way to reduce the risk of loosing important MMCO information is to use dec_ref_pic_marking_repetition Supplementary Enhancement Information (SEI) messages. However the encoder will not know if the decoder is capable of making use of dec_ref_pic_marking_repetition SEI messages. Further, there is a risk that the dec_ref_pic_marking_repetition SEI message is also lost.

There is, thus, a need for an efficient reference picture signaling and buffer management that do not suffer from the shortcomings and limitations of prior art solutions.

SUMMARY

It is a general objective to provide an efficient reference picture signaling and buffer management in connection with video encoding and decoding.

This and other objectives are met by embodiments disclosed herein.

An aspect of the embodiments relates to a method of decoding an encoded representation of a picture of a video stream of multiple pictures. The method comprises retrieving buffer description information identifying a buffer description defining multiple reference pictures from the encoded representation of the picture. A picture identifier identifying a reference picture of the multiple reference pictures is determined based on picture identifier information retrieved from the buffer description for the reference picture and picture identifier information retrieved from the buffer description for a reference picture preceding the reference picture according to a list order in the buffer description. A decoded picture buffer is thereby updated based on the determined picture identifier.

A related aspect of the embodiments defines a decoder configured to decode an encoded representation of a picture of a video stream of multiple pictures. The decoder comprises a data retriever configured to retrieve buffer description information identifying a buffer description defining multiple reference pictures from the encoded representation of the picture. A picture identifier determiner is configured to determine a picture identifier identifying a reference picture of the multiple reference pictures based on picture identifier information retrieved by the data retriever from the buffer description for the reference picture and picture identifier information retrieved by the data retriever from the buffer description for a reference picture preceding the reference picture according to a list order in the buffer description. The decoder also comprises a buffer manager configured to update a decoded picture buffer based on the picture identifier.

Another related aspect of the embodiments defines a decoder comprising an input section configured to receive encoded representations of multiple pictures of a video stream. The decoder also comprises a processor configured to process code means of a computer program stored in a memory. The code means causes, when run on the processor, the processor to retrieve buffer description information identifying a buffer description defining multiple reference pictures from the encoded representation of the picture. The processor is also caused to determine a picture identifier identifying a reference picture of the multiple reference pictures based on picture identifier information retrieved from the buffer description for the reference picture and picture identifier information retrieved from the buffer description for a reference picture preceding the reference picture according to a list order in the buffer description. The processor is further caused to update a decoded picture buffer based on the picture identifier. An output section of the decoder is configured to output decoded pictures of the video stream.

Another aspect of the embodiments relates to a method of encoding a picture of a video stream of multiple pictures. The method comprises determining, for the picture, multiple reference picture of the multiple pictures as encoding reference for the picture and/or a subsequent picture in the video stream. The method also comprises providing, for each reference picture, a picture identifier identifying the reference picture. Picture identifier information is determined for each reference picture of at least a portion of the multiple reference pictures except a first reference picture according to a list order. The picture identifier information is determined based on a picture identifier identifying the reference picture and based on a picture identifier identifying a preceding reference picture according to the list order. Buffer description information identifying a buffer description defining the multiple reference pictures is generated. This buffer description information is inserted into an encoded representation of the picture.

A related aspect of the embodiments defines an encoder configured to encode a picture of a video stream of multiple pictures. The encoder comprises a reference picture determiner configured to determine, for the picture, multiple reference picture of the video stream as encoding reference for the picture and/or any subsequent picture of the video stream. The encoder also comprises a picture identifier provider configured to provide, for each reference picture, a picture identifier identifying the reference picture. An information determiner is configured to generate picture identifier information for each reference picture of at least a portion of the multiple reference pictures except a first reference picture according to a list order. The picture identifier information is determined based on a picture identifier identifying the reference picture and based on a picture identifier identifying a preceding reference picture according to the list order. The encoder also comprises a buffer description information generator configured to generate, based on the picture identifier information, buffer description information identifying a buffer description defining the multiple reference pictures. A data inserter of the encoder is configured to insert the buffer description into an encoded representation of the picture.

Another related aspect of the embodiments defines an encoder comprising an input section configured to receive multiple pictures of a video stream and a processor configured to process code means of a computer program stored in a memory. The code means causes, when run on the processor, the processor to determine, for a picture of the video stream, multiple reference picture of the video stream as encoding reference for the picture and/or any subsequent picture of the video stream. The processor is also caused to provide, for each reference picture, a picture identifier identifying the reference picture and generate buffer description information based on the at least one picture identifier. The code means further causes the processor to determine picture identifier information for each reference picture of at least a portion of the multiple reference pictures except a first reference picture according to a list order. The picture identifier information is determined based on a picture identifier identifying the reference picture and based on a picture identifier identifying a preceding reference picture according to the list order. The code means also causes the processor to generate, based on the picture identifier information, buffer description information identifying a buffer description defining the multiple reference pictures. The code means additionally causes the processor to insert the buffer description in an encoded representation of the picture. The encoder further comprises an output section configured to output encoded representations of pictures.

In clear contrast to the prior art solutions in which correct reference picture management is dependent on that previously encoded pictures have been correctly received and decoded, the embodiments provides buffer description information that is used for reference pictures in an absolute and explicit way instead of a relative or implicit way. Thus, the encoded representation of a picture contains the information about which reference pictures to use for reference during decoding independent of the encoded representations of previous pictures in the video stream.

The embodiments thereby make reference picture management and signaling less vulnerable to errors since the decoder will only have to rely on information contained in the current picture for the reference picture management of the current picture instead of relying on correctly delivered and interpreted buffer operations in previous pictures.

In addition, the encoding and decoding of picture identifiers relative to preceding reference pictures in the buffer description enables a bit efficient representation of the picture identifiers that will reduce any overhead in signaling the buffer description. The embodiments thereby reduce the bitrate required for signaling of identification values in absolute reference picture signaling.

BRIEF DESCRIPTION OF THE DRAWINGS

The invention, together with further objects and advantages thereof, may best be understood by making reference to the following description taken together with the accompanying drawings, in which:

FIG. 3 is a video stream of multiple pictures according to an embodiment;

FIG. 4 is an encoded representation of a picture according to an embodiment;

FIG. 5 is a flow chart of the step of determining first picture identifier in FIG. 2 according to an embodiment;

FIG. 8 is flow chart of additional, optional steps of the method in FIG. 2;

DETAILED DESCRIPTION

Figure 1:
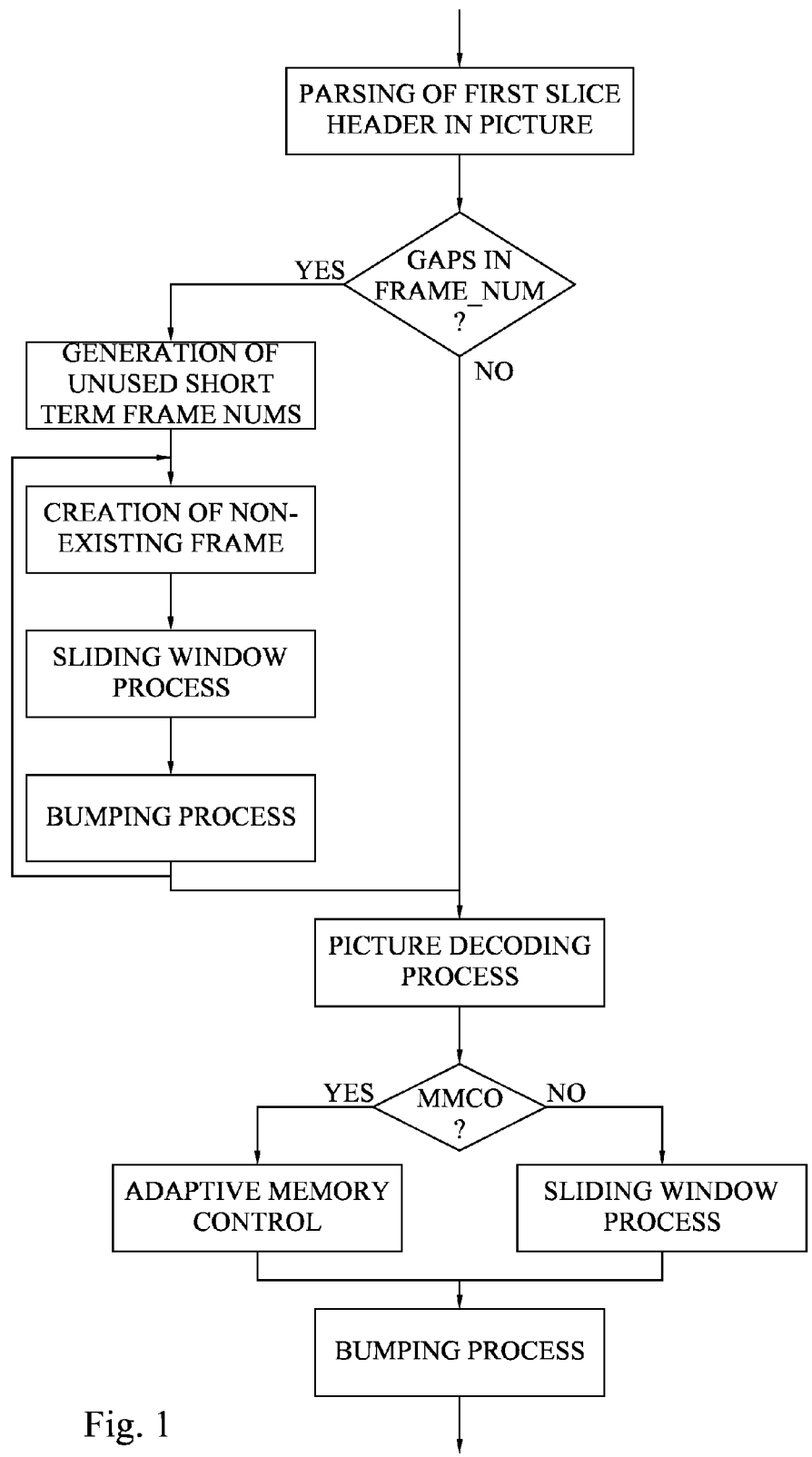
FIG. 1 is a simplified flow chart of the H.264/AVC reference buffer scheme.

Throughout the drawings, the same reference numbers are used for similar or corresponding elements.

The present embodiments generally relate to encoding and decoding of pictures, also referred to as frames in the art, of a video stream. In particular, the embodiments relate to management of reference pictures in connection with video encoding and decoding and the signaling of such reference pictures from the encoder to the decoder.

Video encoding, such as represented by H.264/MPEG-4 AVC and HEVC, utilizes reference pictures as predictions or references for the encoding and decoding of pixel data of a current picture. This is generally referred to as inter coding in the art where a picture is encoded and decoded relative to such reference pictures. In order to be able to decode an encoded picture, the decoder thereby has to know which reference pictures to use for the current encoded picture and has to have access to these reference pictures. Generally, the decoder uses a decoded picture buffer (DPB), also denoted reference picture buffer, for storing the reference pictures. It is then important that the reference pictures stored in the decoded picture buffer are indeed the correct reference pictures when decoding an encoded picture otherwise the decoder will use wrong reference pictures during the decoding process causing a degradation of the quality of the presented video.

The prior art techniques may suffer from problems with regard to using incorrect reference pictures when a picture carrying MMCO information is unintentionally lost, which was discussed in the background section. This problem of the prior art can be illustrated by the following H.264-implemented example. Assume that the decoded picture buffer stores three short term pictures with picture identifiers 300, 302 and 303 and two long term pictures with picture identifiers 0 and 3. The encoder might then generate a new encoded picture with a MMCO type 2 command stating that the long term picture 0 should be marked as "unused for reference". If this encoded picture would have been correctly received at the decoder the long term picture 0 would have been marked as unused for reference and the reference picture list would have been {300, 302, 303, 3}. However, if the encoded picture with the MMCO type 2 command is lost, the decoder is not informed that the long term picture 0 should be marked as unused for reference and the reference picture list is therefore instead {300, 302, 303, 0, 3}. If a next encoded picture received at the decoder comprises information that the reference picture at position 3 in the reference picture list is to be used as prediction for a macroblock in the picture there will be a problem if the MMCO type 2 command is lost. If the MMCO type 2 command had been correctly received at the decoder, the reference picture at position 3 in the reference picture list would correspond to the long term picture 3 as this reference picture occupies position 3 (if starting with 0) in the reference picture list. However, with a lost MMCO type 2 command position 3 in the reference picture list is instead occupied by the long term picture 0. This means that pixel data from the long term picture 0 will be used as prediction basis instead of the correct pixel data from the long term picture identifier 3.

Thus, the prior art solution has a problem that correct reference picture management is dependant on that previously decoded pictures have been correctly received and decoded.

The present embodiments do not have these problems of the prior art techniques by using a fundamentally different approach for signaling reference pictures as compared to the prior art. The present embodiments instead specify which decoded pictures to be used for reference pictures in an absolute or explicit way instead of a relative or implicit way. Another way to put it is that the encoded representation, i.e. the bitstream, for a current picture contains the information about what pictures to use for reference, i.e. reference pictures, independent of the encoded representations of previous pictures. It can therefore be said that the logical responsibility for maintaining correct decoded picture buffer is moved from the decoder to the bitstream. One way to look at it is to say that the information about what reference pictures to use for inter prediction and motion vector prediction for a picture is included in the control information of the picture. Hence, the state of the decoded picture buffer is signaled for every picture that is encoded and decoded relative to other pictures.

According to the embodiments a picture is associated with a buffer description defining reference pictures that are needed to encode and decode the current picture and/or needed to encode and decode a subsequent picture of the video stream according to an output order of the pictures at the decoder. Buffer description information defining this buffer description is then included by the encoder in the encoded representation of the picture and is therefore available to the decoder together with the encoded data of the current picture.

The embodiments relate to an efficient way of using the buffer description for defining the reference pictures that is bit efficient.

Signaling picture identifiers directly in the buffer description is generally not efficient in particular when using variable length coding. A reason is that the picture identifiers could be relatively large numbers that require many bits for encoding. Furthermore, the reference pictures used as prediction basis for the current picture and/or a subsequent picture in the video stream are generally adjacent pictures or at least present close to the current picture in the video stream. Hence, a more bit efficient approach is to define picture identifiers in the buffer description as delta picture identifiers relative to the picture identifier of the current picture.

In such an approach a reference picture is signaled in the buffer description with a delta picture identifier, deltaPOC, relative to the current picture. The picture identifier, POC (ref), of the reference picture is then calculated as POC(ref)= POC(currPic)+deltaPOC, where POC(currPic) represents the picture identifier of the current picture.

In a particular embodiment, restrictions could be specified so that a same picture, i.e. the same deltaPOC, may not appear more than one time in the same buffer description. This enables a buffer description to unambiguously and explicitly define each reference picture that is to be signaled for the current picture. However, this might lead to inefficient signaling of picture identifiers in the buffer description.

For instance, assume a buffer description where all reference pictures have negative delta picture identifiers. Further assume that a first reference picture in the buffer description for the current picture has delta picture identifier deltaPOC=−1 that is encoded with one bit using variable length code, such as unsigned variable length code (UVLC). A delta picture identifier of −1 would then be the shortest codeword for the next reference picture. However, if the above mentioned restriction is to apply to buffer descriptions such a value of −1 represented by one bit is forbidden for the next reference picture since there is already a reference picture with that codeword in the buffer description. Thus, the second reference picture in the buffer description must then use at least three bits for representing its delta picture identifier using UVLC.

The embodiments solve this limitation of signaling reference pictures.

An aspect of the embodiments decode the identification value of a reference picture, signaled with absolute signaling of reference pictures, using already decoded identification values of reference pictures, signaled with absolute signaling of reference pictures in a buffer description.

Thus, the embodiments use an order in which the reference pictures appear in the buffer description. Hence, when decoding the picture identifier of a reference picture with index i in the buffer description, the picture identifier(s) from the reference picture(s) already decoded in the buffer description is(are) used. This enables a decrease in the bitstream bit cost of signaling the picture identifiers for the reference picture with index i.

Figure 2:
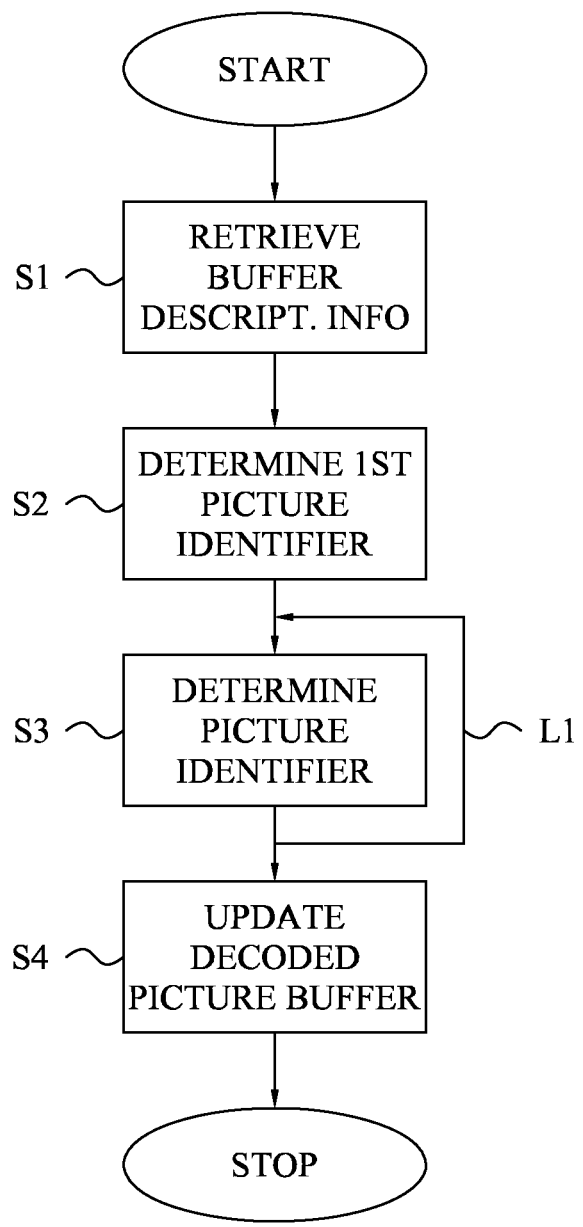
FIG. 2 is a flow chart of a method of decoding an encoded representation of a picture according to an embodiment.

FIG. 2 is a flow chart illustrating a method of decoding an encoded representation of a picture of a video stream of multiple pictures or frames. The method generally starts in step S1 where buffer description information identifying a buffer description is retrieved from the encoded representation of the picture.

The buffer description information could be provided in any defined portion of the encoded representation of the picture but is typically provided in a control information field in the encoded representation of the picture. The retrieval of the buffer description information can therefore be performed in connection with decoding the control information of the encoded representation of the picture and therefore preferably prior to decoding of the actual payload data of the encoded representation.

FIG. 4 schematically illustrates an example of an encoded representation 60 of a picture. The encoded representation 60 comprises video payload data 66 that represents the encoded pixel data of the pixel blocks in a slice. The encoded representation 60 also comprises a slice header 65 carrying control information. The slice header 65 forms together with the video payload and a Network Abstraction Layer (NAL) header 64 a NAL unit that is the entity that is output from an encoder. To this NAL unit additional headers, such as Real-time Transport Protocol (RTP) header 63, User Datagram Protocol (UDP) header 62 and Internet Protocol (IP) header 61, can be added to form a data packet that can be transmitted from an encoder to a decoder. This form of packetization of NAL units merely constitute an example in connection with vide transport. Other approaches of handling NAL units, such as file format, MPEG-2 transport streams, MPEG-2 program streams, etc. are possible.

The buffer description information could then be included in the slice header 65, another picture header or another data structure specified by the standard to which the encoder and decoder conforms.

The buffer description information retrieved in step S1 identifies a buffer description, also referred to as reference picture set (RPS), which defines multiple reference pictures. Hence, the buffer description defines reference pictures that are used as decoding reference for the current picture to be decoded. This means that the pixel data of the current picture is decoded with reference to one or more reference pictures. Alternatively, or in addition, at least one reference picture defined by the buffer description could be used as decoding reference for a subsequent picture of the video stream, i.e. a picture to be decoded after the current picture. Thus, the buffer description defines all reference pictures that are prior to the current picture in decoding order and that may be used for inter prediction for the current picture or any picture, referred to as subsequent picture herein, following the current picture according to the decoding order.

The buffer description information can therefore be regarded as information identifying a buffer description that is a set of reference pictures associated with a current picture. It consists of all reference pictures that are prior to the current picture in decoding order and that may be used for inter prediction of the current picture or any picture following the current picture in decoding order.

FIG. 3 schematically illustrates this concept by showing a video stream 1 of multiple pictures 10, 40, 42, 50. A current picture 10 may comprise one or more slices 20, 22 comprising pixel blocks 30, such as macroblocks, also referred to as treeblocks, or coding units, to be decoded. The arrows below the pictures 10, 40, 42, 50 indicate the decoding relationship. The current picture 10 is decoded in relation to a previous reference picture 40 and a subsequent reference picture 42. The preceding reference picture 40 is preceding and the subsequent reference picture 42 is subsequent with regard to the current picture 10 according to the output order but both are preceding the current picture 10 according to the decoding order. This subsequent reference picture 42 is furthermore used as reference picture for a subsequent, according to the decoding order, picture 50 in the video stream 1.

A following optional but preferred step S2 of FIG. 2 will be further described below.

The next step S3 uses the buffer description obtained using the buffer description information retrieved in step S1 to determine a picture identifier identifying a reference picture defined by the buffer description. According to the embodiments the picture identifier of the reference picture is determined in step S3 based on picture identifier information retrieved from the buffer description for the reference picture and picture identifier information retrieved from the buffer description for a reference picture preceding the reference picture according to a list order in the buffer description.

Hence, the picture identifier of a given reference picture defined by the buffer description is determined relative to picture identifier information of at least one preceding reference picture defined by the buffer description. This preceding reference picture precedes or these preceding reference pictures precede the given reference picture according to the list order defined in the buffer description. Hence, the buffer description lists or identifies reference pictures in a list order. The embodiments therefore not only uses picture identifier information of the given reference picture retrieved from the buffer description but also picture identifier information of any preceding reference picture(s).

In a particular embodiment, the buffer description defines at least one list of reference pictures. In such a case, step S3 is preferably performed for each reference picture of the at least one list except a first, according to the list order, reference picture in the respective at least one list. This is schematically illustrated by the line L1 in FIG. 2. The first reference picture according to the list order has its picture identifier determined in step S2 described further below. Thus, if the buffer description defines a list of N reference pictures in a list, step S3 is preferably performed N−1 times.

Once the picture identifiers of the reference pictures defined by the buffer description of the current picture have been determined in step S3 (and step S2) the method continues to step S4 where a decoded picture buffer is updated at the decoder based on the determined picture identifiers.

Hence, the picture identifiers determined using the buffer description of the current picture are used in order to update the decoded picture buffer to store and comprise the correct reference pictures needed to decode the current picture and/or a subsequent, according to the decoding order, picture of the video stream. This decoding is well known in the art and typically uses inter prediction and motion vector decoding Once the decoded picture buffer has been updated to comprise the correct reference pictures needed for decoding the current picture the picture is decoded based on the encoded representation of the picture and at least one of the reference pictures comprised, present or stored in the decoded picture buffer and identified based on the buffer description information carried in the encoded representation of the picture.

The updating of the decoded picture buffer in step S4 preferably implies that the reference pictures identified by the determined picture identifiers are marked as "used for reference" or marked as "used for prediction" to indicate that these reference pictures are to be used as decoding reference or prediction for the current picture and/or any subsequent picture. In a particular embodiment, reference pictures could be marked as used for short-term reference or as used for long-term reference.

It could be possible that the decoded picture buffer comprises reference pictures that are not defined by the buffer description of the current picture and therefore have picture identifiers that differ from the picture identifiers determined in steps S2 and S3. In an embodiment, pictures that are available in the decoded picture buffer but not included in the buffer description are marked as "unused for reference" or "unused for prediction" or are removed by the decoder from the decoded picture buffer. Thus, in this embodiment marking of pictures as "unused for reference" or removing reference pictures from the decoded picture buffer is performed by the decoder as a part of updating the decoded picture buffer and therefore prior to decoding the video payload of the current picture.

In an additional embodiment, zero or more of the pictures that are marked as unused for reference by the decoder according to the buffer description are output for display by the decoder. One such example process for output is the bumping process from H.264/MPEG-4 AVC. Output refers herein to output for display. What pictures to use as reference pictures and what pictures to output, i.e. display, is separated in H.264 and HEVC. This means that a picture can be output before it is removed as reference picture, i.e. marked as unused for reference, or it can be removed as reference frame by marking it as unused for reference before it is output.

As discussed in the foregoing in connection with step S3, a picture identifier of a reference picture is determined based on picture identifier information retrieved from the buffer description for the relevant reference picture and also based on picture identifier information for any reference picture preceding the relevant reference picture according to the list order in the buffer description.

The first, according to the list order, reference picture defined by the buffer description identified from the buffer description retrieved in step S1 from the encoded representation of the picture does, of course, not comprise any reference picture preceding the first reference picture according to the list order in the buffer description.

Step S2 of FIG. 2 defines an embodiment of how to determine the picture identifier of this first reference picture based on the buffer description information. Step S2 determines the picture identifier of the first reference picture based on picture identifier information retrieved from the buffer description for the first reference picture and based on the picture identifier of the current picture to be decoded. Hence, picture identifier information obtained from the buffer description is combined with the actual picture identifier of the current picture to get the picture identifier of the first reference picture according to the list order.

In a particular embodiment, the buffer description could define multiple, i.e. at least two, lists of reference pictures, which is further discussed herein. In such a case, each such list has a respective first reference picture according to a respective list order. Step S2 then preferably determines the picture identifier of the first reference picture in each list. The discussion provided below with regard to particular embodiments of determining the picture identifier of a first picture identifier could therefore be applied to the respective first reference pictures in the each list.

FIG. 5 is a flow chart illustrating a particular embodiment of determining the first picture identifier. The method continues from step S1 of FIG. 2 and continues to step S10. This step S10 retrieves a delta picture identifier and a sign identifier for the first reference picture from the buffer description. Herein, absolute_delta_poc(0) represents the delta picture identifier and sign represents the sign identifier. The sign identifier indicates whether the reference pictures are in ascending or descending order in relation o the current picture in the video stream and with regard to the output order of the pictures. Thus, if the sign identifier indicates "+" the reference pictures follow the current picture according to the output order, but precede the current picture in decoding order, whereas a sign identifier indicating "−" indicates that the reference pictures precede the current picture according to the output order and according to the decoding order.

A next step S11 calculates the picture identifier of the first reference picture based on the delta identifier, the sign identifier and the picture identifier of the current picture, denoted POC(currPic) herein. The method then continues to step S3 of FIG. 2, where the picture identifiers of the remaining reference pictures defined by the buffer description can be determined.

Figure 6:
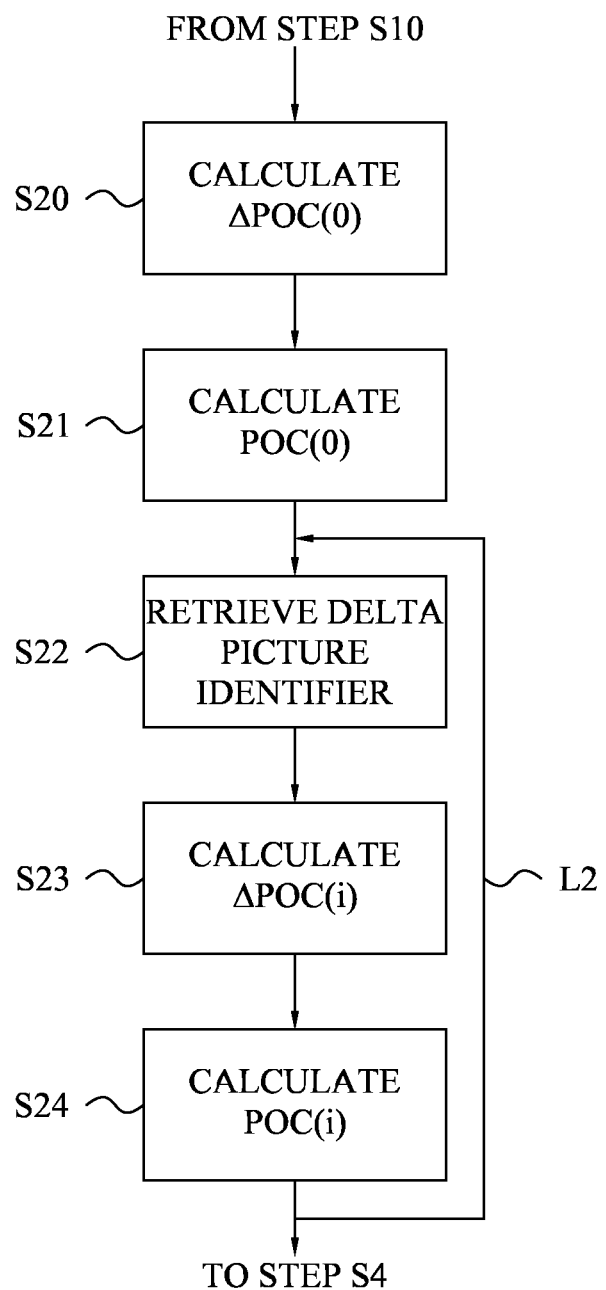
FIG. 6 is a flow chart of the calculating step in FIG. 5 and the step of determining picture identifier in FIG. 2 according to an embodiment.

FIG. 6 is a flow chart illustrating a particular embodiment of step S11 in FIG. 5 and a particular embodiment of step S3 in FIG. 2. The method continues from step S10 in FIG. 5. A next step S20 calculates a parameter deltaPOC(0) as deltaPOC(0)=sign×absolute_delta_poc(0). The picture identifier, POC(0), of the first reference picture is then calculated in step S21 as POC(0)=POC(currPic)+deltaPOC(0).

The following steps S22 to S24 illustrate an embodiment of determining picture identifier for any remaining reference picture, i.e. non-first reference picture, defined by the buffer description. These steps S22 to S24 are performed for each list of reference pictures in the buffer description.

Step S22 retrieves a respective delta picture identifier, absolute_delta_poc(i), from the buffer description for each reference picture number i defined by the buffer description except the first reference picture in the current list. The following step S23 calculates a parameter deltaPOC(i) as deltaPOC(i)=deltaPOC(i−1)+absolute_delta_poc(i) if the list defines the reference pictures in ascending order or as deltaPOC(i)=deltaPOC(i−1)−absolute_delta_poc(i) if the list defines the reference pictures in descending order. In a particular embodiment, the encoder and decoder are preferably both preconfigured to use either the ascending or descending order.

Finally step S24 calculates the picture identifier, POC(i), of the reference picture number i as POC(i)=POC(currPic)+deltaPOC(i). Thus, the picture identifier of a reference picture defined in the buffer description is determined based on picture identifier information, represented in this embodiment by the delta picture identifier absolute_delta_poc(i), retrieved from the buffer description for the reference picture and based on picture identifier information retrieved from the buffer description for preceding reference pictures according to the list order. In a particular embodiment, the picture identifier is also determined based on the picture identifier of the current picture to be decoded, i.e. POC(currPic). Thus, a general formula of calculating the picture identifier, POC(i), is $$POC(i) = POC(currPic) + \text{sign} \times \text{absolute\_delta\_poc}(0) \pm \sum_{j=1}^{i} \text{absolute\_delta\_poc}(j),$$

where the selection between "+" and "−" depends on the value of sign.

Steps S22 to S24 are performed for each reference picture in the list except the first reference picture, which is schematically indicated by the line L2. The method then continues to step S4 of FIG. 2.

The order of steps S20 to S24 may be different from what is shown in FIG. 6. In an embodiment, the method first performs step S20 followed by the loop formed by steps S22, S23. Finally, the picture identifiers are calculated for the first and all following reference picture in a step that combines the processes of steps S21 and S24.

In the above described embodiment the reference pictures in the buffer description are ordered in deltaPOC order, ascending or descending. The sign of deltaPOC is preferably only signaled for the first reference picture and delta picture identifiers, absolute_delta_poc, are signaled relative to the preceding reference picture in the buffer description. For the first reference picture in the buffer description absolute_delta_poc is signaled relative to the current picture.

In this embodiment the decoder decodes the sign of the first reference picture in the buffer description based on the sign identifier. The decoder then decodes absolute_delta_poc of the first reference picture relative to the current picture. Then deltaPOC for the first reference picture is calculated. The decoder continues by decoding absolute_delta_poc for all remaining pictures in the buffer description with index i in the range from 1 (if the first reference picture has index 0) to the end of the buffer description, i.e. to NrOfPicturesInBufferDescription−1, and calculates deltaPOC relative to the current picture as disclosed above.

In a particular embodiment, the buffer description information retrieved in step S1 of FIG. 2 from the encoded representation of the encoded picture identifies a buffer description defining a first list of reference pictures and a second list of reference pictures.

Thus, in this embodiment the buffer description consists of the concatenation of two lists of reference pictures. One list contains the reference pictures with positive deltaPOC and one list contains the pictures with negative deltaPOC. Both lists are preferably ordered by the delta picture identifiers, absolute_delta_poc, in ascending order and the value of the delta picture identifier is signaled relative to the preceding reference picture in the corresponding list.

In this embodiment the decoder decodes the two lists, denoted list A and list B below, that each may contain zero or more picture delta identifiers, absolute_delta_poc. For each index in both lists the value absolute_delta_poc is parsed.

Figure 7:
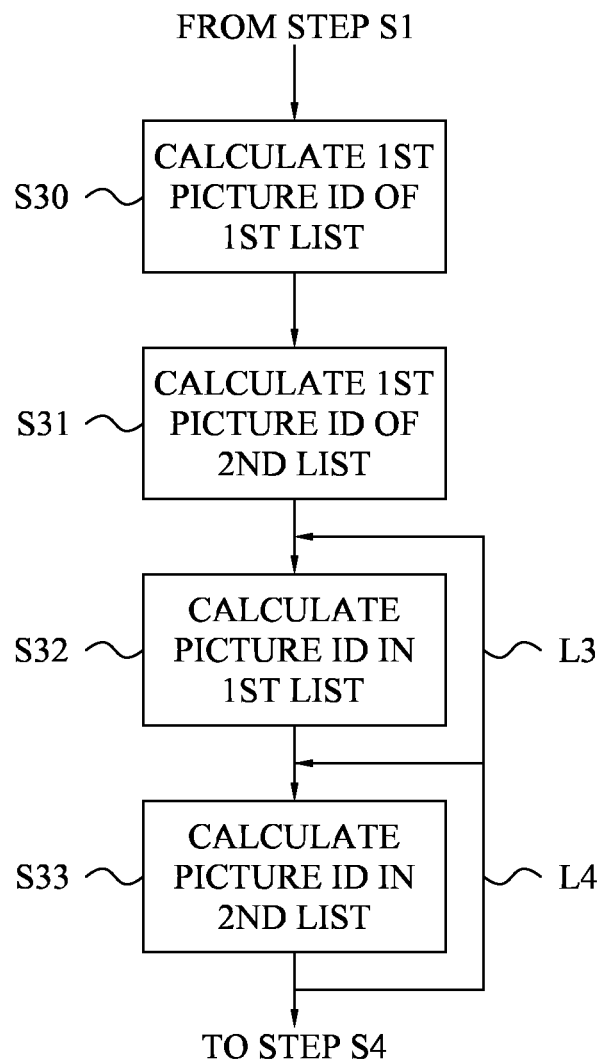
FIG. 7 is a flow chart of the step of determining first picture identifier and the step of determining picture identifier in FIG. 2 according to an embodiment.

FIG. 7 is a flow chart illustrating an implementation of steps S2 and S3 in FIG. 2 according to this embodiment. The method continues from step S1 of FIG. 7. Step S30 calculates a pictures identifier identifying the first reference picture in the first list based on a difference between the picture identifier of the current picture to be decoded and a delta picture identifier retrieved from the buffer description for the first reference picture in the first list. Step S31 correspondingly calculates a picture identifier identifying the first reference picture in the second list based on a sum of the picture identifier of the current picture and a delta picture identifier retrieved from the buffer description for the first reference picture in the second list.

In a particular embodiment step S30 calculates $POC_A(0)=POC(currPic)-absolute\_delta\_poc_A(0)$ and step S31 calculates $POC_B(0)=POC(currPic)+absolute\_delta\_poc_B(0)$. In this embodiment the delta picture identifiers absolute_delta_poc$_A$(0) and absolute_delta_poc$_B$(0), are unsigned values, i.e. non-negative values. In an alternative embodiment, the delta picture identifiers could be signed values. In such a case, the delta picture identifier of the first reference picture in the first list is preferably a non-positive value, while the delta picture identifier of the first reference picture in the second list is preferably a non-negative value. Step S30 then calculates $POC_A(0)=POC(currPic)+absolute\_delta\_poc_A(0)$ and step S31 calculates $POC_B(0)=POC(currPic)+absolute\_delta\_poc_B(0)$.

Steps S30 and S31 can be performed serially in any order, i.e. first step S30 and then step S31 or first step S31 and then step S30. Alternatively, the two steps S30 and S31 can be performed at least partly in parallel.

The following steps S32 and S33 calculate picture identifiers for the remaining reference pictures in the two lists.

In an embodiment step S32 calculates the picture identifier for each reference picture in the first list except the first reference picture in the first list according to a first list order based on a difference between the picture identifier of the preceding reference picture in the first list and an unsigned delta picture identifier retrieved from the buffer description for the reference picture. Step S33 correspondingly calculates the picture identifier for each reference picture in the second list except the first reference picture in the second list according to a second list order based on a sum of the picture identifier of a preceding reference picture in the second list and an unsigned delta picture identifier retrieved from the buffer description for the reference pictures. The first list order is preferably in the form of decreasing picture identifier values, whereas the second list order is preferably in the form of increasing picture identifier values. For instance, if the picture identifiers indicate output orders, the reference pictures in the first list are output for display prior to the current picture while the reference pictures in the second list are output for display after the current picture. The reference pictures in the first list are then ordered in a descending list order with regard to picture identifier values and the reference pictures in the second list are ordered in an ascending list order with regard to the picture identifier values.

A particular embodiment of step S32 calculates the picture identifier, $POC_A(i)$, for picture number i in the first list as $POC_A(i)=POC_A(i-1)-absolute\_delta\_poc_A(i)$. Step S33 correspondingly calculates the picture identifier, $POC_B(i)$, for picture number i in the second list as $POC_B(i)=POC_B(i-1)+absolute\_delta\_poc_B(i)$.

In an alternative embodiment the delta picture identifiers retrieved from the buffer description are signed delta picture identifiers. In a particular implementation, the delta picture identifiers for the reference pictures in the first set preferably have non-positive values and the delta picture identifier for the reference pictures in the second set preferably have non-zero values.

An implementation of step S32 according to this embodiment calculates the picture identifier for each reference picture in the first list except the first reference picture in the first list based on a sum of the picture identifier of the preceding reference picture in the first list and a signed delta identifier retrieved from the buffer description for the reference picture. Preferably the picture identifier is calculated in step S32 as $POC_A(i)=POC_A(i-1)+absolute\_delta\_poc_A(i)$. Correspondingly, step S33 calculates the picture identifier for each reference picture in the second list except the first reference picture in the second list based on a sum of the picture identifier of the preceding reference picture in the second list and a signed delta identifier retrieved from the buffer description for the reference picture. The picture identifier is preferably calculated in step S33 as $POC_B(i)=POC_B(i-1)+absolute\_delta\_poc_B(i)$.

The picture identifier of the preceding reference picture in the first or second list mentioned above is preferably the picture identifier of the closest preceding reference picture, i.e. reference picture number i−1 if the given reference picture has number i.

Steps S32 and S33 are, as mentioned above, preferably performed for each reference picture in the first and second list except the first picture in the first and second list, which is schematically indicated by the lines L3 and L4 in FIG. 7. Thus, step S32 is preferably performed for every index i in the range from 1 to NrOfValuesInListA−1 (if index 0 indicates the first reference picture in the first list) and step S33 is preferably performed for every index i in the range from 1 to NrOfValuesListB−1 (if index 0 indicates the first reference picture in the second list).

Steps S32 and S33 can be performed in any serial order or indeed at least partly in parallel. The method then continues to step S4 of FIG. 2, where the decoded picture buffer is updated based on the picture identifiers calculated in steps S30 to S33.

In an embodiment, step S30 and S32 relating to the first list constitutes a sub-process and steps S31 and S33 relating to the second step constitutes a sub-process. The two sub-processes can then be performed serially in any order or at least partly in parallel.

The above described embodiments of signaling reference pictures in a buffer description by encoding and decoding picture identifiers relative to preceding reference pictures according to the list order(s) in the buffer description are particularly suitable in connection with variable length coding. In such a approach, low values of the picture identifier information, such as delta picture identifiers, are generally represented by shorter, in terms of number of symbols or bits, codewords as compared to higher values of the picture identifier information.

For instance, assume that a current picture has a picture identifier of 48 and that the current picture is encoded with reference to four reference pictures with picture identifiers 46, 47, 49 and 51. Further assume that the largest possible value of a picture identifier is 255. If fixed length coding would have been applied and without encoding picture identifiers relative to each other then 4×8=32 bits would have been required to signal these four picture identifiers. If variable length coding instead would have been used to represent 46, 47, 49 and 51 even longer codewords than in total 32 bits would have been needed. If the embodiment disclosed above in connection with FIG. 7 is used with unsigned delta picture identifiers the first list would contain the delta picture identifiers 1, 1 and the second list would contain the delta picture identifiers 1, 2. These values 1, 1, 1, 2 can be efficiently encoded by variable length code using fewer bits than 32 bits, such a 1+1+1+3=6 bits in total. This significant bit reduction is for only one buffer description. In a typical video stream there may be several hundreds or thousands of buffer descriptions sent from the encoder to the decoder.

The above described signaling of picture identifiers in the buffer description can be complemented with a list defining at least one picture identifier in an absolute way, such as using fixed length coding. For instance, the buffer description might contain the above mentioned four reference pictures 46, 47, 49 and 51 and optionally a further reference picture that has a picture identifier value that significantly differs from the picture identifier values of these four reference pictures, such as 2. In such a case, it could be more efficient from encoding point of view to define the buffer description to comprise at least one list of reference pictures where the picture identifiers are decoded based on picture identifier information retrieved from the buffer description for the current reference picture and any reference picture preceding the current reference picture in the list. In the above presented example, a first list would define reference pictures 46 and 47 and a second list would define reference pictures 49 and 51. This at least one list (in the present example two lists) is then complemented with a list comprising at least one picture identifier of a respective reference picture, i.e. reference picture 2 in the example. This picture identifier is then preferably provided in fixed length code and not encoded relative to any other reference picture defined in the buffer description.

Alternatively, this additional list defines at least one reference picture and comprises a respective delta picture identifier for the at least one reference picture. This delta picture identifier is then obtained by calculating a difference between the picture identifier of the current picture and the picture identifier of the reference picture. This at least one delta picture identifier is then provided in the additional list in the buffer description and may preferably provided in fixed length code or encoded similar to the lists mentioned above, i.e. relative to previous delta picture identifier. In such a case, variable length code can be used but with a selective modulo operation that can be applied to save bits.

FIG. 8 is a flow chart illustrating additional steps of the method in FIG. 2 with a buffer description comprising such an additional list. The method continues from step S3 of FIG. 2. A next step S40 provides a list comprising at least one picture identifier of a respective reference picture. This step S40 can be implemented by retrieving the list from the buffer description information included in the encoded representation of the picture. Alternatively, the list could be retrieved from a defined control information field of the encoded representation of the picture.

A next step S41 modifies the buffer description using the list provided in step S40. This implies that the at least one picture identifier defined in the provided list is added to the picture identifiers determined from the buffer description to form a modified or updated buffer description.

The method then continues to step S4 where the decoded picture buffer is updated based on the modified buffer description.

This embodiment of modifying the buffer description using another list describing reference pictures coded in an absolute way, preferably using fixed length coding, can decrease the bitrate for the buffer description if the buffer description contains reference pictures with high values of the delta picture identifier.

The buffer description information retrieved from the encoded representation of the picture could, in an embodiment, constitute the buffer description per se. Hence, the encoded representation of the picture thereby comprises the picture identifier information, such as delta picture identifiers, of the reference pictures defined by the buffer description.

This buffer description could then be included in the slice header, another picture header or another data structure specified by the standard to which the encoder and decoder conforms. Generally, a picture 10 as shown in FIG. 3 could be decomposed into one or more slices 20, 22 where each slice is independently encodable and decodable relative to the other slices of the picture 10. In an embodiment, each slice header of a given picture comprises the same buffer description information. This means that even if a data packet carrying the video payload and control information of one of the slices of the picture is lost in the transmission from the encoder to the decoder, remaining slices of the picture can be decodable by the decoder since each such remaining slice comprises a respective copy of the buffer description information.

In another embodiment the buffer description information present in the encoded representation of the picture does not necessarily have to be the same as the buffer description of the current picture but rather enables identification and retrieval of the buffer description. Thus, in this embodiment the buffer description information present in the encoded representation of the picture indirectly defines the reference pictures by pointing towards the buffer description which carries the picture identifier information, such as delta picture identifiers, enabling calculation of the picture identifiers of the reference pictures as disclosed herein.

In such a case, the buffer description could be carried by a data structure associated to the encoded representation 60 of the picture, see FIG. 4. Examples of such data structures include a Picture Parameter Set (PPS) 67 and a Sequence Parameter Set (SPS) 68. The PPS 67 and/or the SPS 68 could be directly included in the encoded representation 60 but is typically associated thereto through the inclusion of a PPS identifier and/or SPS identifier in the encoded representation 60. For instance, each slice header 65 could include a PPS identifier notifying which PPS 67 to apply for the current picture. The relevant PPS 67 may in turn include an SPS identifier notifying which SPS 68 to apply for the PPS 67 and therefore for the current picture.

The buffer description could then be inserted in the PPS 67 or the SPS 68 assigned to the current picture. In such a case, the PPS identifier or SPS identifier that is present in the encoded representation 60 constitutes the buffer description information that is present in the encoded representation 60. This PPS identifier or SPS identifier then enables retrieval of the buffer description that defines the reference pictures and the PPS identifier or SPS identifier therefore indirectly defines the reference picture.

PPS 67 and SPS 68 merely constitutes examples of data structures associated to encoded representations 60 of pictures and which can be used to carry buffer description information according to the embodiments.

The PPS and SPS are typically shared between multiple pictures in the video stream. Therefore signaling the buffer description of a picture in the PSS and the SPS is preferably performed by providing a data structure, such as table, comprising multiple predefined buffer descriptions each defining respective reference pictures.

Each buffer description of the generated data structure then defines the reference pictures as disclosed herein in terms of picture identifier information from which the picture identifiers can be calculated based on the picture identifier of the current picture and based on picture identifier information of preceding reference pictures in the buffer description. Each buffer description could then be provided as an entry in the data structure or table.

The data structure is signaled from the encoder to the decoder. This signaling can be performed according to various embodiments. The data structure could be carried in the PPS, the SPS, a novel parameter set or in another data structure specified by the standard to which the encoder and decoder conforms. In such a case, the encoded representation of a picture comprises a PPS identifier or an SPS identifier, such in a slice header. This PPS identifier or SPS identifier, forming part of the buffer description information, enables identification of the data structure that is available when decoding the current picture.

In order to specify which buffer description of the data structure to use for the current picture an identifier, forming part of the buffer description information, is signaled for the current picture and included in the encoded representation of the picture. An example of such an identifier is a non-negative integer signaled in the slice header(s) of the current picture representing the number of the buffer description in the order in which the buffer descriptions appear in the data structure Introducing buffer description entries in, for instance, the SPS reduces the bit overhead of signaling the buffer descriptions explicitly in the slice header. These buffer descriptions can be used for multiple slices/pictures in the same sequence, i.e. video stream, and thus reduce the number of bits required per picture.

According to a further embodiment, explicit signaling of buffer description and reference signaling to an entry in a general data structure with multiple predefined buffer descriptions, such as an entry in the table above, can be combined. In such a case, these can be combined by the decoder to form a final buffer description for the current picture. One way to combine the explicit signaling and the reference signaling is to join the set of reference pictures described by explicit signaling with the set of reference pictures described by the reference signaling to form a joint set of reference pictures.

In a particular embodiment, the encoded representation of the picture preferably comprises a flag to indicate whether explicit signaling of the buffer description information and/or implicit signaling of the buffer description information has been selected for the current picture. This flag could, for instance, be included in the slice header of the encoded representation of the picture or in some other control information field.

In embodiments disclosed herein the buffer description could include respective delta picture identifiers for the reference pictures defined by the buffer description. An embodiment of such delta picture identifiers is the previously discussed parameter absolute_delta_poc. In an alternative embodiment, the parameter absolute_delta_poc is obtained based on the delta picture identifier of a reference picture. For instance, the delta picture identifier included in the buffer description for a reference picture could be the parameter absolute_delta_poc_minus1. The parameter absolute_delta_poc is then obtained as absolute_delta_poc_minus1+1. Hence present embodiments also encompass the case where the parameter absolute_delta_poc is replaced in the disclosed equations with the parameter absolute_delta_poc_minus1+1 or a similar variant. For instance, the equation $POC_A(i)=POC_A(i-1)-\text{absolute\_delta\_poc}_A(i)$ would then be replaced by $POC_A(i)=POC_A(i-1)-(\text{absolute\_delta\_poc\_minus1}_A(i)+1)$.

Figure 9:
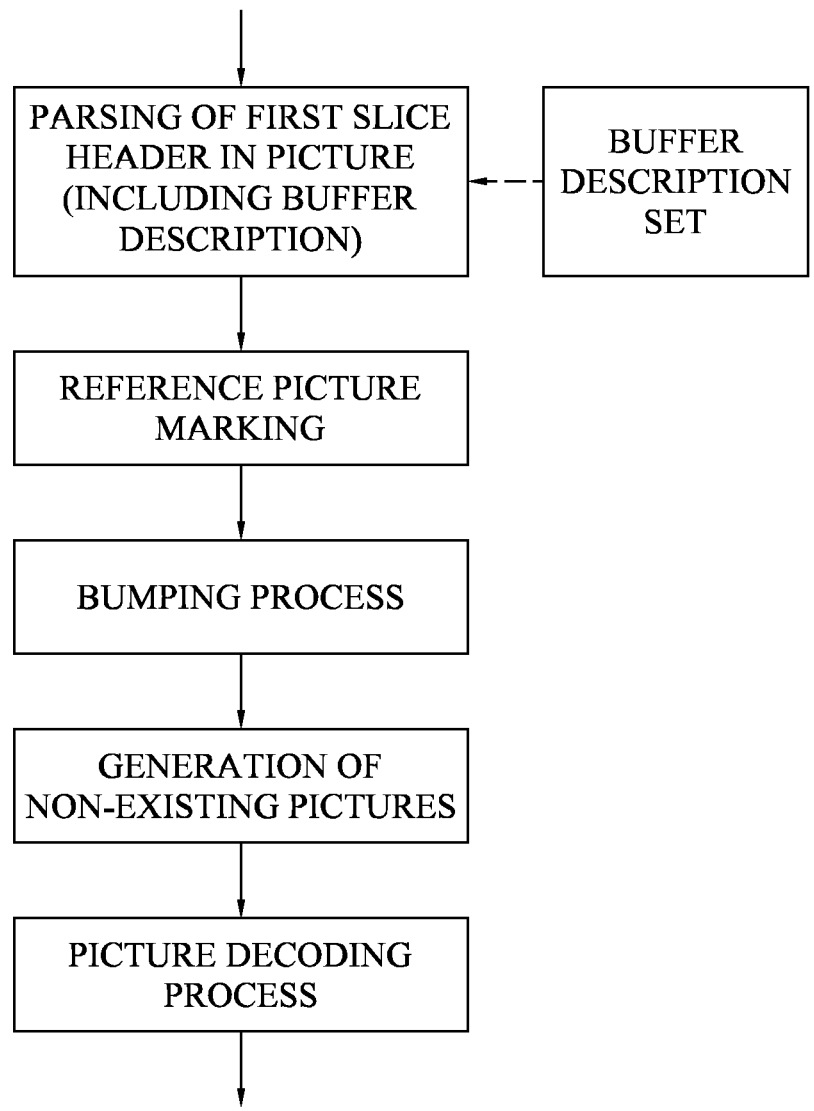
FIG. 9 is a simplified flow chart of a reference buffer scheme according to an embodiment.

FIG. 9 is a simplified flow chart of a reference buffer scheme according to an embodiment. In this scheme all decoded picture buffer operations are applied after parsing of the first slice header of a picture but before the picture decoding, using a description of the decoded picture buffer as illustrated in FIG. 9. The buffer description is, for instance, signaled in the slice header either explicitly or by reference to a predefined data structure signaled in a PPS or an SPS.

The embodiments thereby provide large conceptual changes to the decoding process. In traditional H.264/MPEG-4 AVC and previous designs of HEVC, relative operations are given to the decoder either implicitly, i.e. sliding window, or explicitly, MMCO, and the decoder is responsible for applying these relative operations and keeping track of the reference pictures, i.e. which pictures can be used for reference. In the proposed scheme the reference pictures, i.e. which pictures can be used for reference, is signaled within the current picture, such as in the slice header, thus removing the need of implicitly and explicitly signaled relative operations.

This means that each picture will have an absolute description of the reference pictures instead of a relative description as in H.264/MEPG-4 AVC where delta information is retrieved from MMCO or from using the sliding window process.

According to a particular embodiment, the buffer description contains picture identifier information of all reference pictures needed in the decoded picture buffer in order to provide an absolute reference to the pictures to be used as reference pictures. The picture identifier information is used to calculate the picture identifiers of the reference picture as previously disclosed herein.

All pictures in the decoded picture buffer that are not part of the buffer description are preferably marked as unused for reference.

In H.264/MPEG-4 AVC the process that delivers pictures for output (referred to as "bumping" process in FIG. 1) is sometimes performed prior to decoding, i.e. if there was a gap in frame num. The "bumping" process is also performed after decoding and picture marking.

In the proposed scheme of FIG. 9 the "bumping" process is applied prior to decoding. It could be argued that this imposes extra delay in the decoding process before delivery of pictures for output. However it should be noted that the first picture to display is uniquely defined already after the decoding process step as soon as the number of non-displayed pictures in decoded picture buffer is larger than or equal to num_reorder_frames. Thus, a decoder can deliver that picture for display directly after the decoding process step. Thus the delay of the proposed scheme is equal to the delay of the current HEVC scheme.

In an optional approach the decoder could determine a reference picture defined by the buffer description but not present in the reference picture as missing. Optionally a concealed or non-existing picture could then be generated based on the buffer description and thereby assign the picture identifier determined for the missing picture to the concealed or non-existing picture.

The above mentioned picture marking process, bumping process and optional generating non-existing pictures are preferably performed prior to the actual decoding of the video payload data for the current picture as indicated in FIG. 9.

There are various alternatives available that could be used as picture identifier according to the embodiments. For instance, the picture identifier could be the decoding order number, the display order number, the output order number or a combination of display order number and an additional identifier or indeed any other information that can be used to unambiguously identify the picture.

Examples of such picture identifiers include Picture Order Count (POC), frame number (frame_num) or POC and an additional identifier (additional_picture_id).

In a particular embodiment, the actual value of the picture identifier is used together with additional information or other data, such as the position (list order position) of the reference picture in buffer description to unambiguously identify the relevant reference picture. Hence, the buffer description identified or obtained by the buffer description information enables an unambiguously identification of the relevant reference pictures. In an embodiment, the picture identifier itself, such as POC or POC plus an additional identifier, can be used to unambiguously identify the reference picture.

Unambiguously identify a reference picture is used herein to denote that the picture identifier itself or the picture identifier together with other information in the buffer description information, such as the order at which the buffer description defines the reference pictures, is used to explicitly identify a reference picture. Hence, given the picture identifier or the picture identifier and the other information enables identification of the relevant reference picture among the pictures of the video stream.

Figure 10:
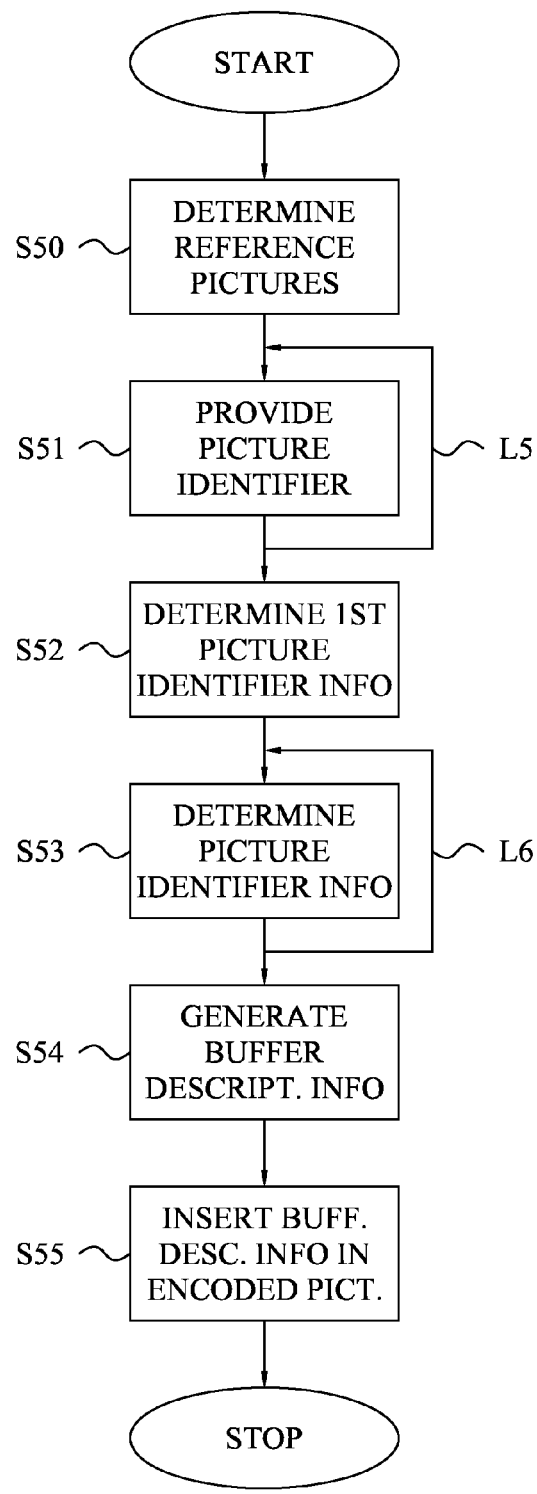
FIG. 10 is a flow chart of a method of encoding a picture according to an embodiment.

FIG. 10 is a flow chart illustrating a method of encoding a picture of a video stream of multiple pictures. The method generally starts in step S50 where reference pictures of the video stream are determined as encoding reference. In an embodiment, step S50 determines one or more reference pictures that are used as encoding reference for a current picture to be encoded. Hence, the pixel data of the current picture is then encoded with reference to the one or more reference pictures. Alternatively, or in addition at least one reference picture determined in step S50 could be used as encoding reference for a subsequent picture of the video stream, i.e. a picture to be encoded and decoded following the current picture. In a particular embodiment S50 determines, for the current picture, any reference picture of the video stream as encoding reference for the current picture and any reference picture of the video stream as encoding reference for the subsequent picture. Hence, in a particular embodiment step S50 determines all reference pictures that are prior to the current picture in decoding order and that may be used for inter prediction for the current picture or any picture following the current picture in decoding order.

A next step S51 provides a respective picture identifier for each reference picture of the reference pictures determined in step S50. The picture identifier is used, possibly together with other data, to unambiguously identify a reference picture. Hence, the picture identifier can be regarded as an absolute reference to pictures to be used a reference pictures. This means that it is possible to correctly identify the relevant reference picture given its picture identifier and optionally the other data.

Step S51 is preferably performed for each reference picture determined in step S50, which is schematically illustrated by the line L5.

The picture identifiers provided in step S51 could be read from header portions of the reference pictures determined in step S50 or otherwise retrieved from the data represented the reference pictures from step S50.

Step S52 which relates to the determining of the picture identifier information of the first reference picture in each list of the buffer description will be further described below.

Step S53 is performed for each reference picture of at least a portion of the reference pictures determined in step S50 except a first reference picture according to a list order of the reference pictures. If, as mentioned above, the reference pictures are organized in a single list step S53 is preferably performed for each reference picture except the first reference picture, which is schematically illustrated by the line L6. However, if the reference pictures are organized in multiple lists step S53 is preferably performed for each reference picture except the respective first reference picture in each list.

Step S53 determines picture identifier information for a "non-first" reference picture based on a picture identifier identifying the reference picture and based on a picture identifier identifying a preceding reference picture in the current list according to the list order.

The next step S54 generates information of a buffer description, also referred to as reference picture set (RPS). This information is denoted buffer description information herein. The buffer description information is generated based on the picture identifier information determined in step S53 (and in step S52). This buffer description information defines, preferably unambiguously defines, the reference pictures determined in step S50 and thereby the picture identifiers provided in step S51. Hence, it is possible to derive the at least one picture identifier from the buffer description information.

The generated buffer description information is inserted in step S55 in an encoded representation of the current picture. Hence, the encoded picture therefore carries the buffer description information that can be used at the decoder to define and identify the reference pictures that are needed to decode the current picture and/or any subsequent picture of the video stream.

The method of FIG. 10 with steps S50 to S55 is preferably performed for each picture in the video stream except any IDR picture that cause a decoded picture buffer refresh and thereby does not need any buffer description information.

Step S52 of FIG. 10 determines the picture identifier information for the first reference picture or for each first reference picture per list in the buffer description. The picture identifier information is determined based on the picture identifier identifying the first reference picture and provided in step S51 and the picture identifier of the current picture to be encoded.

Figure 11:
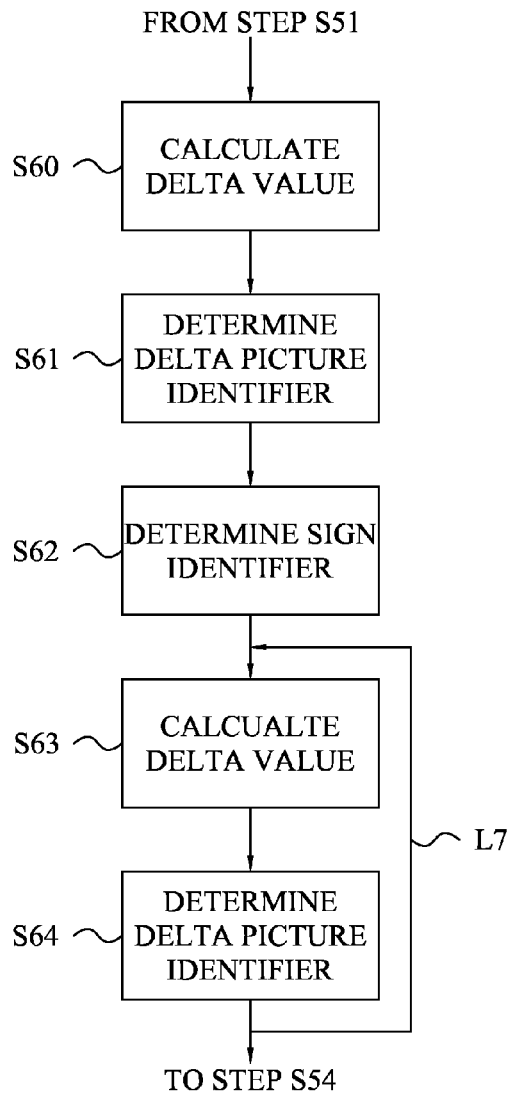
FIG. 11 is a flow chart of the step of determining first picture identifier information and the step of determining picture identifier information in FIG. 10 according to an embodiment.

FIG. 11 is a flow chart illustrating a particular embodiment of this step S52 and the following step S53 in FIG. 10. The method continues from step S51 in FIG. 10. A next step S60 calculates a delta value based on a difference between the picture identifier of the first reference picture and the picture identifier of the current picture. The following step S61 determines a delta picture identifier based on an absolute value of the delta value and step S62 determines a sign identifier based on a sign of the delta value. The picture identifier information of the first reference picture thereby comprises the delta picture identifier and the sign identifier. Thus, in an embodiment deltaPOC(0)=POC(0)−POC(currPic) and absolute_delta_poc=|deltaPOC(0)| and sign represents sign(deltaPOC(0)).

Step S63 calculates a delta value for each reference picture (in each list) except the first reference picture. This delta value is calculated based on a difference between the picture identifier of the reference picture and the picture identifier identifying the preceding reference picture (in the list) according to the list order. In a particular embodiment this delta value is calculated as deltaPOC(i)=POC(i)−POC(i−1) for the reference picture number i.

The following step S64 determines a delta picture identifier for the reference picture. This delta picture identifier is determined based on a difference between the delta value calculated in step S63 and a delta picture identifier determined for the preceding reference picture according to the list order or based on a sum of the delta value and the delta picture identifier determined for the preceding reference picture according to the list order. The selection between using a difference or a sum depends in an embodiment on whether the encoder and decoder are configured to organize the reference pictures in ascending or descending order. Thus, in an embodiment absolute_delta_poc(i)=deltaPOC(i)±absolute_delta_poc(i−1).

Steps S63 and S64 are thus performed for each reference picture per list except the respective first reference pictures, which is schematically illustrated by the line L7.

The method then continues to step S54 of FIG. 10.

Figure 12:
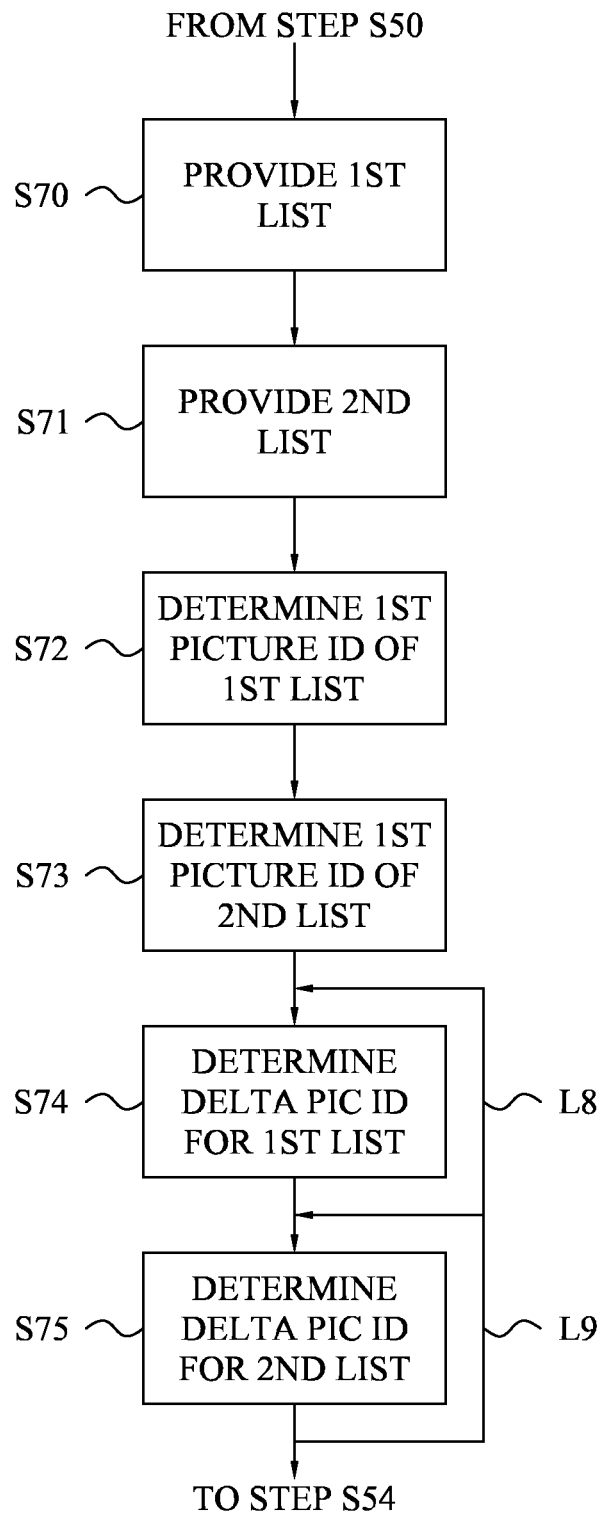
FIG. 12 is a flow chart of the steps S50 to S53 in FIG. 10 according to an embodiment.

FIG. 12 is a flow chart illustrating a particular embodiment of steps S51-S53 in FIG. 10. The method continues form step S50 in FIG. 10. A next step S70 provides a first list of picture identifiers identifying any reference picture determined in step S50 in FIG. 10 preceding the current picture according to a defined order, such as output order. Step S71 correspondingly provides a second list of picture identifiers identifying any reference pictures determined in step S50 in FIG. 10 following the current picture according to the defined order. Thus, step S70 provides the number of elements, i.e. picture identifiers, in the first list and step S71 correspondingly provides the number of elements in the second list.

Steps S70 and S71 can be performed sequentially in any order or at least partly in parallel.

A next step S72 determines a delta picture identifier for the first reference picture in the first list based on a difference between the picture identifier of the current picture and the picture identifier of the first reference picture in the first list. In a particular embodiment step S72 determines absolute_delta_poc$_A$(0)=POC(currPic)−POC$_A$(0). Step S73 correspondingly determines a delta picture identifier for the first reference picture identifier in the second list based on a difference between the picture identifier of the first reference picture in the second list and the picture identifier of the current picture. In a particular embodiment step S73 determines absolute_delta_poc$_B$(0)=POC$_B$(0)−POC(currPic).

Steps S72 and S73 can be performed sequentially in any order or at least partly in parallel.

Step S74 is performed for each remaining reference picture in the first list except the first reference picture in the first list, which is schematically illustrated by the line L8. Step S74 determines a delta picture identifier based on a difference between the picture identifier of the preceding reference picture in the first list according to a first list order and the picture identifier of the reference picture. In a particular embodiment step S74 determines absolute_delta_poc$_A$(i)=POC$_A$(i−1)−POC$_A$(i). Step S75 is correspondingly performed for each remaining reference picture in the second list except the first reference picture in the second list, which is schematically illustrated by the line L9. Step S75 determines a delta picture identifier based on a difference between the picture identifier identifying the current picture and the picture identifier of the preceding reference picture in the second list according to a second list order. In a particular embodiment step S75 determines absolute_delta_poc$_B$(i)=POC$_B$(i)−POC$_B$(i−1). The picture identifier information determined for the reference pictures then comprises the delta picture identifiers.

In an embodiment, steps S70, S72, S74 form a sub-process relating to the first list and steps S71, S73, S75 form another sub-process relating to the second list. The two sub-processes can then be performed serially in any order or at least partly in parallel.

Figure 13:
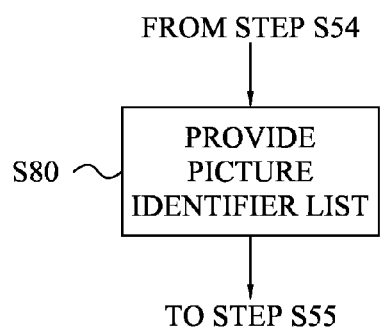
FIG. 13 is a flow chart of an additional, optional step of the method in FIG. 10.

As discussed above in connection with FIG. 8, a list comprising explicit picture identifiers of at least one reference picture or information enabling calculation of such a picture identifier using the picture identifier of the current picture but without any reference to preceding reference picture pictures in the buffer description can be used. FIG. 13 illustrates this approach in connection with an encoder. The method continues from step S54 in FIG. 10. A next step S80 provides a list comprising at least one picture identifier of a respective reference picture. This list is configured to be used to modify the buffer description by adding the at least one picture identifier to the picture identifiers that are determined from the buffer description to form the final picture identifiers of the relevant reference pictures. This list could be inserted in the slice header of the encoded representation of the picture, in another control information field of the encoded representation, or in the PPS or SPS associated with the encoded representation of the picture.

Figure 15:
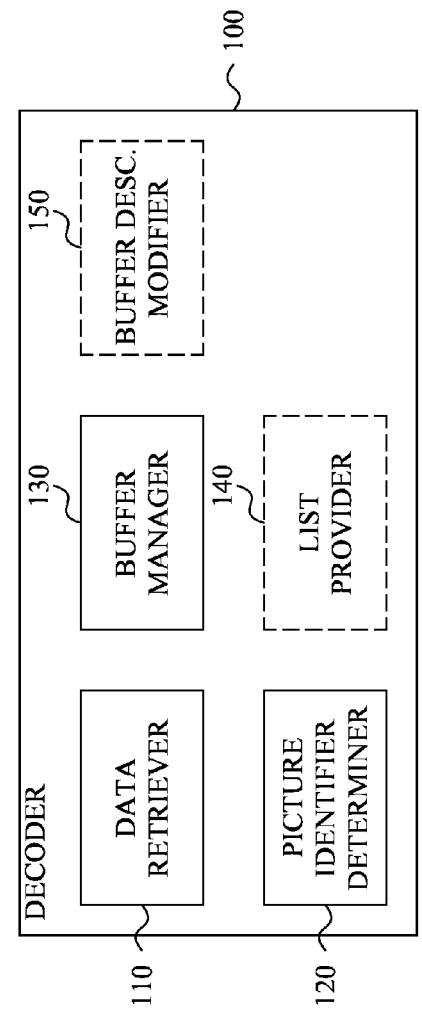
FIG. 15 is a schematic block diagram of a decoder according to an embodiment.

FIG. 15 is a schematic block diagram of a decoder 100 according to an embodiment. The decoder 100 is configured to decode an encoded representation of a picture of a video stream of multiple pictures. The decoder 100 comprises a data retriever 110 configured to retrieve buffer description information identifying a buffer description defining picture identifiers from the encoded representation of the picture. A picture identifier determiner 120 is configured to determine a picture identifier identifying a reference picture defined in the buffer description based on picture identifier information retrieved by the data retriever 110 from the buffer description for the reference picture and a reference picture preceding the reference picture according to a list order in the buffer description. The decoder 100 also comprises a buffer manager 130 configured to update a decoded picture buffer of or associated to the decoder 100 based on the picture identifier determined by the picture identifier determiner 120.

In a particular embodiment, the picture identifier determiner 110 is configured to determine the picture identifier for each reference picture of a list in the buffer description except a first reference picture according to the list order in the list. The picture identifier is determined, as mentioned above, based on the picture identifier information retrieved by the data retriever 110 from the buffer description for the reference picture and any reference picture preceding the reference picture according to the list order in the list.

The picture identifier determiner 120 is preferably also configured to determine a picture identifier identifying a first reference picture according to the list order. The picture identifier determiner 120 determines this picture identifier based on picture identifier information retrieved by the data retriever 110 from the buffer description for the first reference picture and based on the picture identifier of the current picture to be decoded by the decoder 100.

In a particular embodiment, the data retriever 110 is configured to retrieve a delta picture identifier and a sign identifier for the first reference picture from the buffer description. In such a case, the picture identifier determiner 120 is configured to calculate the picture identifier of the first reference picture based on the delta picture identifier, the sign identifier and the picture identifier of the current picture.

Figure 16:
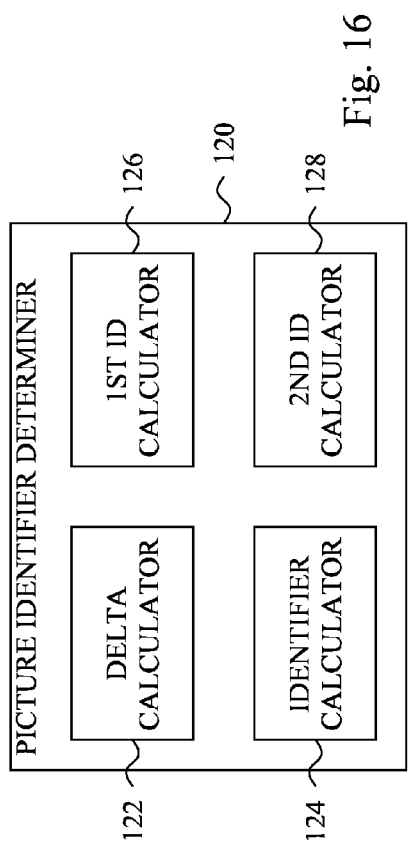
FIG. 16 is a schematic block diagram of a picture identifier determiner in FIG. 16 according to an embodiment.

FIG. 16 is a schematic block diagram of an implementation of the picture identifier determiner 120 in FIG. 15. The picture identifier determiner 120 comprises a delta calculator 122 configured to calculate a delta value deltaPOC(0)=sign×absolute_delta_poc(0) for the first reference picture based on the sign identifier and the delta picture identifier retrieved by the data retriever 110 in FIG. 15. An identifier calculator 124 then calculates the picture identifier as POC(0)=POC(currPic)+deltaPOC(0).

The data retriever 110 is in this embodiment configured to retrieve, from the buffer description, a respective delta picture identifier for each reference picture number i of the at least one list defined in the buffer description except the (respective) first reference picture in the at least one list. The delta calculator 122 of FIG. 16 is then configured to calculate a delta value as deltaPOC(i)=deltaPOC(i−1)+absolute_delta_poc(i) if the buffer description defines the reference pictures in the at least one list in ascending order or as deltaPOC(i)=deltaPOC(i−1)−absolute_delta_poc(i) if the buffer description defines the reference pictures in the at least one list in descending order. The particular order is preferably preconfigured in the decoder 100.

The identifier calculator 124 is configured to calculate the picture identifier of the reference picture number i as POC(i)=POC(currPic)+deltaPOC(i).

In a particular embodiment, the buffer description defines a first list of reference pictures and a second list of reference pictures. The picture identifier determiner 120 preferably comprises a first identifier calculator 126 configured to calculate a picture identifier of a first reference picture in the first list based on the picture identifier of the current picture and a delta picture identifier retrieved by the data retriever 110 from the buffer description for the first reference picture in the first list. The picture identifier is preferably calculated as $POC_A(0)=POC(currPic)-absolute\_delta\_poc_A(0)$. Correspondingly, a second identifier calculator 128 is configured to calculate a picture identifier identifying the first reference picture in the second list based on the picture identifier of the current picture and a delta picture identifier retrieved by the data retriever from the buffer description for the first reference picture in the second list. The picture identifier is preferably calculated as $POC_B(0)=POC(currPic)+absolute\_delta\_poc_B(0)$. In the above disclosed embodiment unsigned delta picture identifiers have been assumed. If the delta picture identifiers are signed values the picture identifiers are calculated as respective sums of the picture identifier of the current picture and the signed delta picture identifier of the first reference picture in the first or second list.

The first identifier calculator 126 is also configured to calculate the picture identifier for each reference picture number i in the first list except the first reference picture in the first list. This picture identifier is calculated based on the picture identifier of the preceding reference picture in the first list according to a first list order and the delta picture identifier retrieved by the data retriever 110 from the buffer description for the reference picture number i. In a particular embodiment the first identifier calculator 126 calculates the picture identifier as $POC_A(i)=POC_A(i-1)-absolute\_delta\_poc_A(i)$ if the delta picture identifier is an unsigned value or as $POC_A(i)=POC_A(i-1)+absolute\_delta\_poc_A(i)$ if the delta picture identifier is a signed value.

The second identifier calculator 128 is correspondingly configured to calculate the picture identifier for each reference picture number i in the second list except the first reference picture in the second list. The picture identifier is calculated based on the picture identifier of the preceding reference picture in the second list according to a second list order and the delta picture identifier retrieved by the data retriever 110 from the buffer description for the reference picture number i. In a particular embodiment the second identifier calculator 128 calculates the picture identifier as $POC_B(i)=POC_B(i-1)+absolute\_delta\_poc_B(i)$. The delta picture identifier is either an unsigned or signed value.

The buffer description information carried by the encoded representation of the picture is used to identify which reference picture(s) that need to be present in the decoded picture buffer for decoding the current picture and for decoding any subsequent picture of the video stream. The buffer description information thereby provides the information to the decoder 100 required to update the decoded picture buffer to store the correct reference picture(s).

In a preferred approach, the buffer manager 130 is configured to mark all reference pictures stored in the decoded picture buffer but not being associated with any of the picture identifiers from the buffer description as unused for reference. The reference pictures present in decoded picture buffer and associated with any of the picture identifiers from the buffer description are instead preferably marked as used for reference.

The buffer manager 130 of the decoder 100 is preferably configured to mark any reference picture prior to the decoder 100 decoding the current picture.

In a particular embodiment the decoder 100 is configured to output zero or more pictures from the decoded picture buffer for display prior to the decoder 100 decodes the current picture. In a particular embodiment, the decoder 100 outputs any reference picture marked as unused for reference by the buffer manager 130.

Once the buffer manager 130 has updated the decoded picture buffer the decoder 100 can decode the picture, i.e. decode the video payload data, based on the encoded representation of the picture and at least one reference picture stored in the updated decoded picture buffer.

The buffer description information is preferably provided in control information of the encoded representation of the picture. For instance, the data retriever 110 could be configured to retrieve the buffer description information from a slice header of the encoded representation of the picture. In such a case the buffer description information is preferably retrieved from the first slice header received for the current picture since any remaining slice headers of the picture will preferably carry the same buffer description information.

In a particular embodiment, the buffer description information constitutes the buffer description with the above mentioned picture identifier information. This data is thereby directly retrieved by the data retriever 110 from the encoded representation of the picture.

In an alternative embodiment, the buffer description information is an identifier of the buffer description. The data retriever 110 thereby retrieves the identifier from the encoded representation of the picture and uses it to identify the correct buffer description to use for the encoded representation of the picture. The identifier could then be an identifier to an entry in a data structure or table comprising multiple predefined buffer descriptions. This data structure could be carried by control data associated to the video stream, such as provided in a PPS or SPS. In such a case, the buffer description information preferably comprises the identifier of the entry in the data structure and the PPS and/or SPS identifier allowing identification of the particular PPS or SPS that carries the data structure.

In a particular embodiment, the decoder 100 comprises a list provider 140 configured to provide a list comprising at least one picture identifier of a respective reference picture. This picture identifier is preferably encoded in fixed length code and without reference to any preceding reference pictures in the buffer description. This list can thereby comprise picture identifiers of any odd reference picture having a picture identifier that significantly differs from the reference pictures in the at least one list of the buffer description that are encoded and decoded in respect to preceding reference picture identifiers.

The at least one picture identifier provided by the list provider, such as retrieved from the slice header or indeed from a separate list in the buffer description, is used by a buffer description modifier 150 to modify the buffer description. Thus, the at least one picture identifier is added to the picture identifiers defined by the buffer description.

Figure 17:
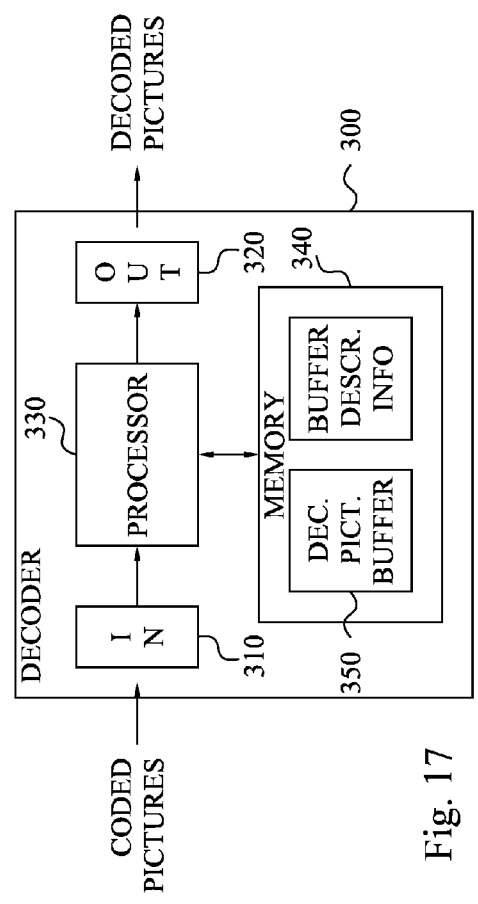
FIG. 17 is a schematic block diagram of a decoder according to another embodiment.

The decoder could be implemented at least partly in software. In such an embodiment as shown in FIG. 17, the decoder 300 comprises an input section 310 configured to receive encoded representations of multiple pictures of a video stream. The decoder 300 also comprises a processor 330 configured to process code means of a computer program stored in a memory 340. The code means causes, when run on the processor 330, the processor 330 to retrieve buffer description information identifying a buffer description defining multiple reference pictures from an encoded representation of a picture. The code means also causes the processor 330 to determine a picture identifier identifying a reference picture based on picture identifier information retrieved from the buffer description information for the reference picture and a preceding reference picture preceding the reference picture according to a list order in the buffer description. The reference picture is to be used as decoding reference for the picture and/or a subsequent picture in the video stream. The processor 330 is further caused to update a decoded picture buffer 330 based on the picture identifier. The decoder 300 also comprises an output section 320 configured to output the decoded pictures of the video stream.

The processor 330 could be a general purpose or specially adapted computer, processor or microprocessor, such as a central processing unit (CPU). The software includes computer program code elements or software code portions effectuating the operation of at least data retriever 110, the picture identifier determiner 120 and the buffer manager 130 of FIG. 15.

The program may be stored in whole or part, on or in one or more suitable volatile computer readable media or data storage means, such as RAM, or one or more non-volatile computer readable media or data storage means, such as magnetic disks, CD-ROMs, DVD disks, hard discs, in ROM or flash memory. The data storage means can be a local data storage means or is remotely provided, such as in a data server. The software may thus be loaded into the operating memory of a computer or equivalent processing system for execution by a processor. The computer/processor does not have to be dedicated to only execute the above-described functions but may also execute other software tasks. A non-limiting example of program code used to define the decoder 300 include single instruction multiple data (SIMD) code.

Alternatively the decoder can be implemented in hardware. There are numerous variants of circuitry elements that can be used and combined to achieve the functions of the units 110-150 of the decoder 100 in FIG. 15. Such variants are encompassed by the embodiments. Particular examples of hardware implementation of the decoder 100 is implementation in digital signal processor (DSP) hardware and integrated circuit technology, including both general-purpose electronic circuitry and application-specific circuitry.

Figure 14:
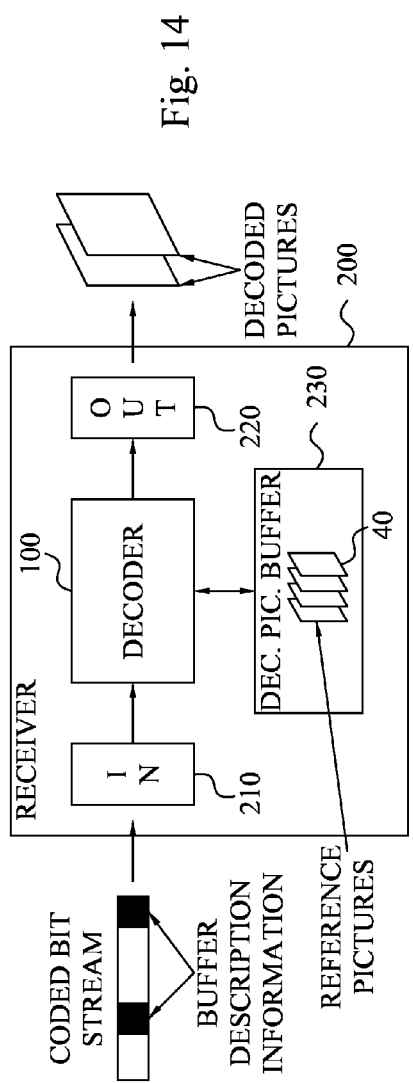
FIG. 14 is a schematic block diagram of a receiver according to an embodiment.

According to an aspect of the embodiments a receiver 200 as shown in FIG. 14 is provided. The receiver 200 comprises an input section 210 configured to receive encoded representations of multiple pictures of a video stream. The encoded representation carries buffer description information according to the embodiments. The encoded representations are forwarded to a decoder 100, such as illustrated in FIG. 15 or in FIG. 17, which is configured to decode the encoded representations of the multiple pictures. An output section 220 of the receiver 200 is configured to output decoded pictures of the video stream. The receiver 200 also comprises a decoded picture buffer 230 storing reference pictures to be used by the decoder 100 when decoding the pictures.

Figure 19:
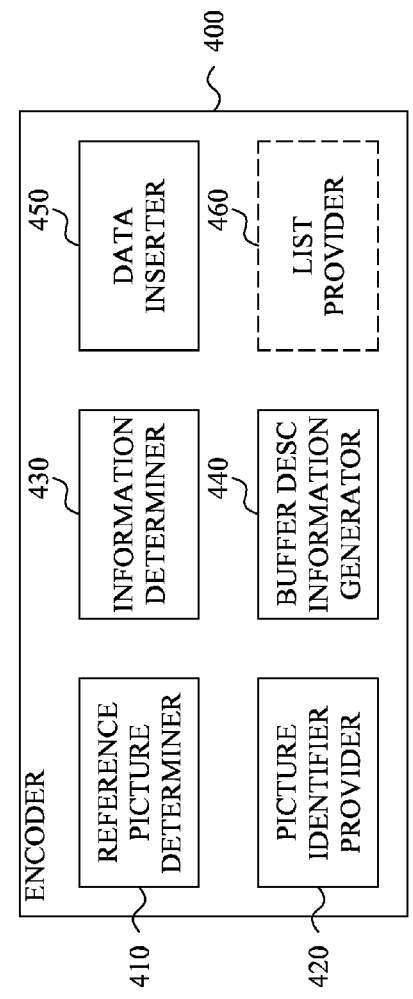
FIG. 19 is a schematic block diagram of an encoder according to an embodiment.

FIG. 19 is a schematic block diagram of an encoder 400 according to an embodiment. The encoder 400 is configured to encode a picture of a video stream of multiple pictures into an encoded representation of the picture. The encoder 400 comprises a reference picture determiner 410 configured to determine multiple reference pictures of the video stream as encoding reference for the picture and/or any subsequent picture in the video stream. A picture identifier provider 420 of the encoder 400 is configured to provide a respective picture identifier of each reference picture determined by the reference picture determiner 410. A picture identifier provided by the picture identifier provider 420 identifies its associated reference picture.

The encoder 400 also comprises an information determiner 430 configured to determine picture identifier information for each reference picture of at least a portion of the reference pictures determined by the reference picture determiner 410 except a first reference picture according to a list order. The picture identifier information is determined based on the picture identifier of the reference picture and based on a picture identifier of a preceding reference picture according to the list order. A buffer description information generator 440 is configured to generate buffer description information based on the determined picture identifier information. The buffer description information generated by the buffer description information generator 440 identifies a buffer description defining the multiple reference pictures determined by the reference picture determiner 410.

A data inserter 450 is implemented in the encoder 400 to insert the buffer description information generated by the buffer description information generator 440 into an encoded representation of the current picture. Hence, the coded bitstream of the video stream with regard to the current picture carries the buffer description information. This means that the encoded representation of the picture will carry the buffer description information that defines the relevant information, i.e. picture identifiers, required by a decoder in order to update the decoded picture buffer for the current picture to thereby enable decoding of the encoded representation of the picture.

The information determiner 430 is preferably also configured to determine picture identifier information for the first reference picture according to the list order. This picture identifier information is then determined based on the picture identifier of the first reference picture and the picture identifier of the current picture.

Figure 20:
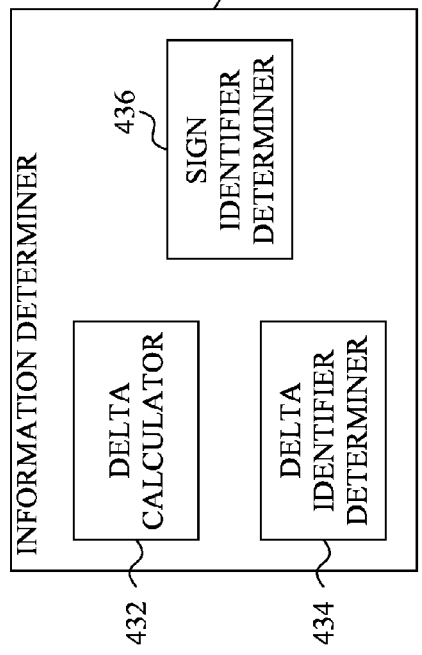
FIG. 20 is a schematic block diagram of an information determiner in FIG. 19 according to an embodiment.

FIG. 20 illustrates a particular implementation of the information determiner 430 in FIG. 19. The information determiner 430 preferably comprises a delta calculator 432 configured to calculate a delta value based on a difference between the picture identifier of the first reference picture and the picture identifier of the current picture, such as deltaPOC (0)=POC(0)−POC(currPic). A delta identifier determiner 434 is then configured to determine a delta picture identifier based on an absolute value of the delta value, such as absolute_delta_poc(0)=|deltaPOC(0)|. A sign identifier determiner 463 is configured to determine a sign identifier based on a sign of the delta value, such as sign is representative of sign (deltaPOC(0)). The picture identifier information of the first reference picture then comprises the delta picture identifier and the sign identifier.

The buffer description preferably comprises at least one list of reference pictures and each having a respective first reference picture. In such a case, the delta picture identifier and sign identifier could be determined for each first reference picture. Alternatively, the delta picture identifier and the sign identifier is determined for a first reference picture of a first list, whereas a first reference picture of a second list only comprises a delta picture identifier as its picture identifier information and this first reference picture then uses an opposite sign as compared to the sign for the first reference picture of the first list.

The delta calculator 432 is then preferably configured to calculate a delta value for each reference picture number i of the at least one list except the respective first reference picture. The delta value is calculated based on the picture identifier of the reference picture and the picture identifier identifying the preceding reference picture in the list according to the list order, preferably based on a difference between these picture identifiers, such as deltaPOC(i)=POC(i)−POC(i−1). The delta identifier 434 is then configured to determine a delta picture identifier for the reference picture number i based on the delta value and a delta picture identifier determined for the preceding reference picture. In a particular embodiment, the delta identifier determiner 434 is configured to determine the delta picture identifier based on a difference between the delta value and the preceding delta picture identifier, such as absolute_delta_poc(i)=deltaPOC(i)−absolute_delta_poc(i−1). Alternatively, the delta identifier determiner 434 determines the delta picture identifier based on a sum of the delta value and the preceding delta picture identifier, such as absolute_delta_poc(i)=deltaPOC(i)+absolute_delta_poc(i−1). Which of these alternatives to use depends on whether the list orders the reference pictures in ascending or descending order and is preferably preconfigured in the encoder 400.

In a particular embodiment the picture identifier provider 420 is configured to provide a first list of picture identifiers of reference pictures preceding the current picture according to a defined order, such as the output order. The picture identifier provider 420 is also configured to provide a second list of picture identifiers of reference pictures following the current picture according to the defined order, such as the output order.

The delta identifier determiner 434 is then preferably configured to determine a delta picture identifier for each reference picture number i in the first list except the first reference picture in the first list according to the first list order. The delta picture identifier is preferably determined based on a difference between the picture identifier of the preceding reference picture in the first list according to the first list order and the picture identifier identifying the reference picture, such as absolute_delta_poc$_A$(i)=POC$_A$(i−1)−POC$_A$(i). The delta identifier determiner 434 also determines a delta picture identifier for each reference picture number i in the second list except the first reference picture in the second list according to the second list order. The delta picture identifier is preferably determined based on a difference between the identifier of said reference picture and the picture identifier identifying the preceding reference picture in said second list according to the second list order, such as absolute_delta_poc$_B$(i)=POC$_B$(i)−POC$_B$(i−1). In an alternative approach signed delta picture identifiers are determined by the delta identifier determiner 434 as previously disclosed herein.

The delta identifier determiner 430 is preferably also configured to determine a delta picture identifier for the first reference picture in the first list based on a difference between the picture identifier of the current picture and the picture identifier of the first reference picture in the first list, such as absolute_delta_poc$_A$(0)=POC(currPic)−POC$_A$(0). The delta identifier determiner 430 also determines the delta picture identifier for the first reference picture in the second list based on a difference between the picture identifier of the first reference picture in the second list and the picture identifier of the current picture, such as absolute_delta_poc$_B$(0)=POC$_B$(0)−POC(currPic).

The encoder 400 of FIG. 19 optionally comprises a list provider 460 configured to provide a list comprising at least one picture identifier of a respective reference picture. This list is to be used by the decoder to modify the buffer description identified by the buffer description information generated for the current picture as previously disclosed herein.

In a preferred embodiment, the data inserter 450 is configured to insert the buffer description information in a respective slice header of the encoded representation of the picture. In such a case, each slice header of the current picture preferably carries the same buffer description information. This enables decoding of a given slice even, though, another slice of the picture is unintentionally lost.

Also other positions among control information in the encoded representation of the picture are possible for carrying the buffer description information as previously discussed herein.

The encoded representation of the picture could carry the picture identifier information determined by the information determiner 430 as buffer description information, for instance in the slice headers. This provides an explicit signaling of the buffer description in the encoded representation of the picture.

In an alternative embodiment, the encoder 400 is configured to generate a data structure comprising multiple predefined buffer descriptions. Each such predefined buffer description thereby defines reference pictures. The data structure can thereby be used for multiple pictures in the video stream for the purpose of providing the buffer description to be used during decoding for the pictures. The buffer description information generator 440 is thereby configured to select a buffer description of the data structure based on the picture identifiers provided by the picture identifier provider 420 for the current picture. The buffer description that correctly matches the picture identifiers is thereby selected and the buffer description information generated by the buffer description information generator 440 comprises an identifier of the selected buffer description.

The data structure could then be inserted in a control information field associated with an encoded representation of the video stream, such as in a PPS or SPS. An identifier of the relevant control information, i.e. a PPS identifier or an SPS identifier (could be in the form of a PPS identifier to a PPS that in turn comprises an SPS identifier to the relevant SPS), is preferably included in control information of the encoded representation of the current picture, such as in the slice header. In an embodiment, the slice header or other control information field thereby carries the control information identifier and the identifier of the selected buffer description as the buffer description information.

Figure 21:
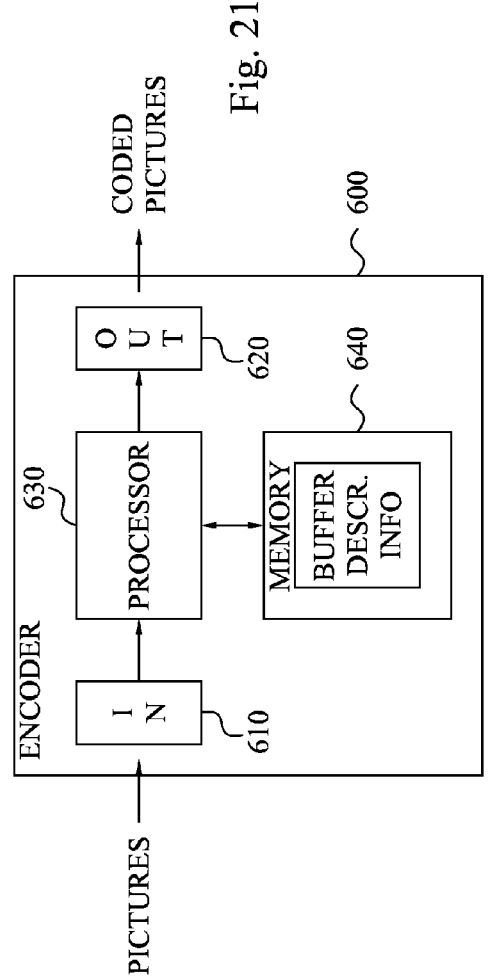
FIG. 21 is a schematic block diagram of an encoder according to another embodiment.

The encoder could be implemented at least partly in software. In such an embodiment as shown in FIG. 21, the encoder 600 comprises an input section 610 configured to receive multiple pictures of a video stream. The encoder 600 also comprises a processor 630 configured to process code means of a computer program stored in a memory 640. The code means causes, when run on the processor 630, the processor 630 to determine, for a picture of the video stream, reference pictures of the video stream as encoding reference for the picture and/or a subsequent picture in the video stream. The processor 630 is also caused to provide, for each reference picture, a picture identifier identifying the reference picture and determine, for each reference picture of at least a portion of the determined reference pictures except a first reference picture according to a list order, picture identifier information based on a picture identifier of the reference picture and based on a picture identifier of a preceding reference picture according to the list order. The processor 630 is further caused to generate buffer description information identifying a buffer description defining the reference pictures based on the picture identifier information. The processor 630 is also caused to insert the buffer description information in an encoded representation of the picture. The encoder 600 also comprises an output section 620 configured to output the encoded representations of the pictures.

The processor 630 could be a general purpose or specially adapted computer, processor or microprocessor, such as a central processing unit (CPU). The software includes computer program code elements or software code portions effectuating the operation of at least the reference picture determiner 410, the picture identifier provider 420, the information determiner 430, the buffer description information generator 440 and the data inserter 450 of FIG. 19.

The program may be stored in whole or part, on or in one or more suitable volatile computer readable media or data storage means, such as RAM, or one or more non-volatile computer readable media or data storage means, such as magnetic disks, CD-ROMs, DVD disks, hard discs, in ROM or flash memory. The data storage means can be a local data storage means or is remotely provided, such as in a data server. The software may thus be loaded into the operating memory of a computer or equivalent processing system for execution by a processor. The computer/processor does not have to be dedicated to only execute the above-described functions but may also execute other software tasks. A non-limiting example of program code used to define the encoder 600 include single instruction multiple data (SIMD) code.

Alternatively the encoder can be implemented in hardware. There are numerous variants of circuitry elements that can be used and combined to achieve the functions of the units 410-460 of the encoder 400 in FIG. 19. Such variants are encompassed by the embodiments. Particular examples of hardware implementation of the encoder 400 is implementation in digital signal processor (DSP) hardware and integrated circuit technology, including both general-purpose electronic circuitry and application-specific circuitry.

Figure 18:
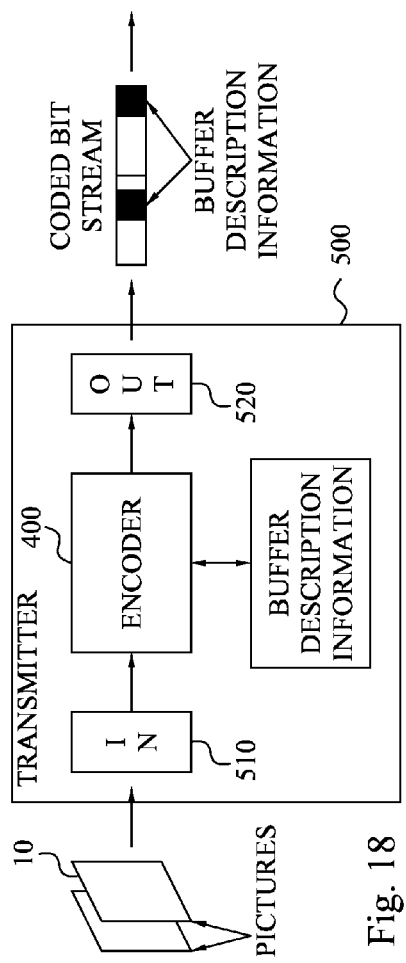
FIG. 18 is a schematic block diagram of a transmitter according to an embodiment.

According to an aspect of the embodiments a transmitter 500 as shown in FIG. 18 is provided. The transmitter 500 comprises an input section 510 configured to receive multiple pictures 10 of a video stream. The pictures 10 are forwarded to an encoder 400, such as illustrated in FIG. 19 or in FIG. 21, which is configured to encode the multiple pictures 10 to generate respective encoded representations of the multiple pictures. An output section 520 of the transmitter 500 is configured to output the respective encoded representations of the multiple pictures as a coded bitstream carrying the buffer description information of the embodiments.

Annex

The present annex present proposed syntax of two embodiments.

| Embodiment 1 | |
|---|---|
| buffer_description( ) { | Descriptor |
|   buffer_description_reference_flag | u(1) |
|   if(buffer_description_reference_flag = = 1) { | |
|     buffer_description_idx | ue(v) |
|   } else { | |
|     number_of_lt_pictures | ue(v) |
|     for(i = 0;i < number_of_lt_pictures;i++){ | |
|       lt_poc[i] | u(v) |
|       if(max_temporal_layers_minus1 > 0) | |
|         lt_temporal_id[i] | u(v) |
|     } | |
|     buffer_description_combination_flag | u(1) |
|     if(buffer_description_combination_flag){ | |
|       buffer_description_combination_idx | u(1) |
|     } else { | |
|       number_of_negative_explicit_pictures | ue(v) |
|       for(i = 0; i < number_of_negative_explicit_pictures; i++) { | |
|         n_absolute_delta_poc_minus_one[i] | ue(v) |
|         if(max_temporal_layers_minus1 > 0) | |
|           n_temporal_id[i] | u(v) |
|       } | |
|       if(num_reorder_frames > 0){ | |
|         number_of_positive_explicit_pictures | ue(v) |
|         for(i = 0; i < number_of_positive_explicit_pictures; i++) { | |
|           p_absolute_delta_poc_minus_one[i] | ue(v) |
|           if(max_temporal_layers_minus1 > 0) | |
|             p_temporal_id[i] | u(v) |
|         } | |
|       } | |
|     } | |
|   } | |
| } | |

| Embodiment 2 | |
|---|---|
| buffer_description( ) { | Descriptor |
|   buffer_description_reference_flag | u(1) |
|   if(buffer_description_reference_flag = = 1) { | |
|     buffer_description_idx | ue(v) |
|   } else { | |
|     number_of_lt_pictures | ue(v) |
|     for(i = 0;i < number_of_lt_pictures;i++){ | |
|       lt_poc[i] | u(v) |
|       if(max_temporal_layers_minus1 > 0) | |
|         lt_temporal_id[i] | u(v) |
|     } | |
|     buffer_description_combination_flag | u(1) |
|     if(buffer_description_combination_flag){ | |
|       buffer_description_combination_idx | u(1) |
|     } else { | |
|       number_of_st_pictures | ue(v) |
|       if(number_of_st_pictures > 0) | |
|       { | |
|         if(num_reorder_frames > 0){ | |
|           sign_first_st_picture | u(1) |
|         for(i = 0; i < number_of_st_pictures; i++) { | |
|           absolute_delta_poc_minus_one[i] | ue(v) |
|           if(max_temporal_layers_minus1 > 0) | |
|             temporal_id[i] | u(v) |
|         } | |
|       } | |
|     } | |
|   } | |
| } | |

The embodiments described above are to be understood as a few illustrative examples of the present invention. It will be understood by those skilled in the art that various modifications, combinations and changes may be made to the embodiments without departing from the scope of the present invention. In particular, different part solutions in the different embodiments can be combined in other configurations, where technically possible. The scope of the present invention is, however, defined by the appended claims.

The invention claimed is:

1. A method of decoding an encoded representation of a current picture of a video stream of multiple pictures, the method comprising:
retrieving, from the encoded representation of the current picture, a buffer description defining at least one list of multiple reference pictures independent of encoded representations of previous pictures;
determining, for each reference picture number i of the at least one list, except a first reference picture of the at least one list according to a list order of the at least one list, a picture identifier identifying the reference picture by:
retrieving a respective delta picture identifier (absolute_delta_poc(i)) for the reference picture from the buffer description, the delta picture identifier signaled relative to a preceding reference picture of the at least one list according to the list order;
calculating deltaPOC(i), where deltaPOC(i) equals
deltaPOC(i−1)+absolute_delta_poc(i) if the at least one list defines the multiple reference pictures in ascending order;
deltaPOC(i−1)−absolute_delta_poc(i) if the at least one list defines the multiple reference pictures in descending order; and
calculating the picture identifier identifying the reference picture (POC(i)) as POC(i)=POC(currPic)+deltaPOC(i), where POC(currPic) represents a picture identifier of the current picture;
determining a picture identifier identifying the first reference picture based on picture identifier information retrieved from the buffer description for the first reference picture and based on the picture identifier of the current picture;
updating a decoded picture buffer based on the determined picture identifiers.

2. The method of claim 1, wherein the determining a picture identifier identifying the first reference picture comprises:
retrieving, from the buffer description, a delta picture identifier which is signaled relative to the current picture and a sign identifier for the first reference picture;
calculating the picture identifier identifying the first reference picture based on the delta picture identifier, the sign identifier, and the picture identifier of the current picture.

3. The method of claim 2, wherein calculating the picture identifier identifying the first reference picture comprises:
calculating deltaPOC(0)=sign×absolute_delta_poc(0), where sign indicates a sign represented by the sign identifier and absolute_delta_poc(0) represents the delta picture identifier;
calculating POC(0)=POC(currPic)+deltaPOC(0), where POC(0) represents the picture identifier identifying the first reference picture.

4. A method of decoding an encoded representation of a current picture of a video stream of multiple pictures, the method comprising:
retrieving, from the encoded representation of the current picture, a buffer description defining a first list of multiple reference pictures and a second list of multiple reference pictures independent of encoded representations of previous pictures;
calculating, for each reference picture number i in the first list, except a first reference picture in the first list according to a first list order, a picture identifier identifying the reference picture (POCA(i)) as
POCA(i)=POCA(i−1)−absolute_delta_pocA(i), where POCA(i−1) represents a picture identifier of a closest preceding reference picture in the first list according to the first list order, where absolute_delta_pocA(i) represents an unsigned delta picture identifier retrieved from the buffer description for the reference picture and signaled relative to a preceding reference picture of the first list according to the first list order;
calculating, for each reference picture number i in the second list, except a first reference picture in the second list according to the second list order, a picture identifier identifying the reference picture (POCB(i)) as
POCB(i)=POCB(i−1)+absolute_delta_pocB(i), where POCB(i−1) represents a picture identifier of a closest preceding reference picture in the second list according to the second list order and absolute_delta_pocB(i) represents an unsigned delta picture identifier retrieved from the buffer description for the reference picture and signaled relative to a preceding reference picture of the second list according to the second list order;
updating a decoded picture buffer based on the calculated picture identifiers.

5. The method of claim 4, further comprising:
calculating a picture identifier identifying the first reference picture in the first list based on a difference between a picture identifier of the current picture and a first delta picture identifier retrieved from the buffer description for the first reference picture in the first list, the first delta picture identifier signaled relative to the current picture;
calculating a picture identifier identifying the first reference picture in the second list based on a sum of the picture identifier of the current picture and a second delta picture identifier retrieved from the buffer description for the first reference picture in the second list, the second delta picture identifier signaled relative to the current picture.

6. A decoder comprising:
an input section configured to receive encoded representations of multiple pictures of a video stream;
a processing circuit operatively connected to the input section and configured to:
retrieve, from the encoded representation of the current picture, a buffer description defining at least one list of multiple reference pictures independent of encoded representations of previous pictures;
determine, for each reference picture number i of the at least one list, except a first reference picture of the at least one list according to a list order of the at least one list, a picture identifier identifying the reference picture by:
retrieving, from the buffer description, a respective delta picture identifier (absolute_delta_poc(i)) for the reference picture, the delta picture identifier signaled relative to a preceding reference picture of the at least one list according to the list order;
calculating deltaPOC(i), where deltaPOC(i) equals:
deltaPOC(i−1)+absolute_delta_poc(i) if the at least one list defines the multiple reference pictures in ascending order;

deltaPOC(i−1)−absolute_delta_poc(i) if the at least one list defines the multiple reference pictures in descending order; and calculating the picture identifier identifying the reference picture, (POC(i)) as POC(i)=POC(currPic)+deltaPOC(i), where POC(currPic) represents a picture identifier of the current picture;

determine a picture identifier identifying the first reference picture based on picture identifier information retrieved from the buffer description for the first reference picture and based on the picture identifier of the current picture;

update a decoded picture buffer based on the determined picture identifiers;

an output section configured to output decoded pictures of the video stream.

7. The decoder of claim 6, wherein the processing circuit is further configured to:

retrieve a delta picture identifier and a sign identifier for the first reference picture from the buffer description;

calculate the picture identifier identifying the first reference picture based on the delta picture identifier, the sign identifier, and the picture identifier of the current picture.

8. The decoder of claim 7, wherein the processing circuit is configured to:

calculate deltaPOC(0)=sign×absolute_delta_poc(0), where sign indicates a sign represented by the sign identifier and absolute_delta_poc(0) represents the delta picture identifier;

calculate POC(0)=POC(currPic)+deltaPOC(0), wherein POC(0) represents the picture identifier identifying the first reference picture.

9. A decoder comprising:

an input section configured to receive encoded representations of multiple pictures of a video stream;

a processing circuit operatively connected to the input section and configured to:

retrieve, from the encoded representation of the current picture, a buffer description defining a first list of multiple reference pictures and a second list of multiple reference pictures independent of encoded representations of previous pictures;

calculate, for each reference picture number i in the first list, except a first reference picture in the first list according to a first list order, a picture identifier identifying the reference picture ($POC_A(i)$) as $POC_A(i)$=$POC_A(i-1)$−absolute_delta_pocA(i), where $POCA(i-1)$ represents a picture identifier of a closest preceding reference picture in the first list according to the first list order, where absolute_delta_pocA(i) represents an unsigned delta picture identifier retrieved from the buffer description for the reference picture and signaled relative to a preceding reference picture of the first list according to the first list order;

calculate, for each reference picture number i in the second list, except a first reference picture in the second list according to the second list order, a picture identifier identifying the reference picture, (POCB(i)), as POCB(i)=POCB(i−1)+absolute_delta_pocB(i), where POCB(i−1) represents a picture identifier of a closest preceding reference picture in the second list according to the second list order, where absolute_delta_pocB(i) represents an unsigned delta picture identifier retrieved from the buffer description for the reference picture and signaled relative to a preceding reference picture of the second list according to the second list order; and update a decoded picture buffer based on the calculated picture identifiers;

an output section configured to output decoded pictures of the video stream.

10. The decoder of claim 9, wherein the processing circuit is further configured to:

calculate a picture identifier identifying the first reference picture in the first list based on a difference between a picture identifier of the current picture and a first delta picture identifier retrieved from the buffer description for the first reference picture in the first list, the first delta picture identifier signaled relative to the current picture;

calculate a picture identifier identifying the first reference picture in the second list based on a sum of the picture identifier of the current picture and a second delta picture identifier retrieved from the buffer description for the first reference picture in the second list, the second delta picture identifier is signaled relative to the current picture.

* * * * *